US007669881B2

(12) United States Patent
Haury et al.
(10) Patent No.: US 7,669,881 B2
(45) Date of Patent: Mar. 2, 2010

(54) COLLAPSIBLE CONVEYANCE FOLDING TRANSPORT CHAIR FOLDING WHEELCHAIR

(76) Inventors: Gilbert E. Haury, 18814 Avon-Beldon Rd., Grafton, OH (US) 44044; Mark Quintile, 719 Salem La., Brunswick, OH (US) 44212

( * ) Notice: Subject to any disclaimer, the term of this patent is extended or adjusted under 35 U.S.C. 154(b) by 116 days.

(21) Appl. No.: 11/894,182

(22) Filed: Aug. 21, 2007

(65) Prior Publication Data

US 2008/0048411 A1 Feb. 28, 2008

Related U.S. Application Data

(63) Continuation-in-part of application No. 11/447,644, filed on Jun. 6, 2006, now Pat. No. 7,258,361.

(51) Int. Cl.
*B62B 1/00* (2006.01)

(52) U.S. Cl. ........................ 280/649; 280/650; 280/657

(58) Field of Classification Search ................. 280/647, 280/649, 644, 650, 42, 47.4, 657; 297/162, 297/452.41, 381, 42
See application file for complete search history.

(56) References Cited

U.S. PATENT DOCUMENTS 5,112,069 A * 5/1992 Aldus et al. ................... 280/42
6,082,813 A * 7/2000 Chen .......................... 297/16.2
6,206,405 B1 * 3/2001 Watkins ....................... 280/647
6,382,729 B1 * 5/2002 Wu ........................ 297/452.41
6,454,348 B1 * 9/2002 Wu ............................ 297/16.2
6,499,804 B1 * 12/2002 Wu ............................ 297/381
6,752,414 B1 * 6/2004 Waldron et al. ............. 280/649
6,776,433 B2 * 8/2004 Harrison et al. ............. 280/647
7,077,422 B2 * 7/2006 Haury et al. ................ 280/647
7,229,128 B2 * 6/2007 Lee ........................... 297/16.2
7,258,361 B2 * 8/2007 Haury et al. ................ 280/649
7,404,601 B2 * 7/2008 Chen .......................... 297/16.2

* cited by examiner

*Primary Examiner*—Hau V Phan
(74) *Attorney, Agent, or Firm*—Roetzel & Andress

(57) ABSTRACT

A collapsible, foldable support structure and conveyance has a frame assembly with multiple interconnected frame members, junction blocks located at intersecting ends of some of the frame members, and wheels attached to the junction blocks or directly to frame members. Fixtures are attached to or integrally formed with the junction blocks for mounting of wheels or other conveyances or components to the frame assembly. A support structure is attached to the frame assembly to support a load such as a human or cargo or both. In a folded configuration, the frame members are moved into a generally parallel arrangement and the junction blocks and conveyances attached to the junction blocks or frame members are drawn together.

6 Claims, 31 Drawing Sheets

COLLAPSIBLE CONVEYANCE FOLDING TRANSPORT CHAIR FOLDING WHEELCHAIR

RELATED APPLICATIONS

This application is a continuation-in-part of U.S. patent application Ser. No. 11/447,644, filed Jun. 6, 2006, now U.S. Pat. No. 7,258,361.

FIELD OF THE INVENTION

The present invention pertains generally to conveyances, powered and unpowered, which collapse or fold from one configuration into another configuration.

BACKGROUND OF THE INVENTION

Various types of conveyances have been devised for transport of goods and people, which are changeable in form from one configuration, such as an operative uncollapsed or unfolded configuration, to a collapsed or folded configuration in which the overall dimensions of the conveyance are reduced. Examples of such devices include folding carts, folding bicycles, folding scooters, folding dollies, etc. The folding mechanics of such devices typically involve the use of one or more scissor joints of cross-members spanning between halves of the frame. This type of folding mechanism, as shown for example in U.S. Pat. Nos. 3,995,882; 4,045,051; 4,164,354 and 6,135,475, effectively enables collapse of the device to approximately one-half its unfolded size, in only one dimension such as side-to-side.

Folding wheelchairs are commonly constructed to bring the side frames together in order to accommodate the large diameter rear wheels. But the right and left side frames, with the associated large rear wheels, when folded together still occupy a relatively large volume of space. This type of folding configuration is not easily manageable for handling, storage or transporting in a vehicle such as an automobile, bus or aircraft or watercraft. It would be very desirable to have a portable conveyance which folds into a collapsed configuration which is smaller than the profile or volume of the side frame members or pieces of a conventional wheelchair.

A common type of folding chair which is now in wide recreational use has a simple seating support frame which has four pairs diagonally intersecting members when unfolded, and at least two upright members located at opposite corners at a rear of the frame. A recreational folding chair of this type is shown, for example, in U.S. Pat. No. 6,247,749, FIG. 1. In this type of frame, the ends of the diagonal frame members at the rear uprights must be free to travel upward along the length of the upright members in order for the frame to collapse into a generally columnar form. The '749 patent also discloses a similar frame with upright members at the front corners of the frame. But because the upright members do not extend above the seating surface, the diagonal side frame members cannot slide up the front upright members when the frame is folded. Therefore, the '749 patent describes front upright members which change in length by telescoping.

Attempts have been made to put wheels on these types of folding chair frames. U.S. Pat. No. 6,428,033 discloses a folding frame to which casters are attached. And U.S. Patent Application Publication No. US 2002/0084627 discloses a folding frame with telescoping front upright members and casters attached to the bottom of the frame. A separate foot rest is attached to the front of the frame. Because some sort of foot support is a necessity for a wheel chair, this presents a challenge to integrate the foot rest with a folding type frame without adding excessively to complexity and cost, and without interfering with the compactness of the chair in a folded configuration. Also, it is preferable for the foot rest to directly unfold with the opening up of the frame so that separate assembly, attachment or orientation of the foot rest is not required each time the chair is unfolded for use.

SUMMARY OF THE INVENTION

The invention provides a collapsible conveyance with a frame assembly which has multiple interconnected frame members including front and rear upright members at corners of the frame assembly, and side members in interconnected pairs spanning between each side of the upright members folding frame. In a preferred embodiment, the intersecting frame side members are arranged in an X, with a pivot joint at the intersection of the frame members. The ends of each of the side members are connected to junction blocks, which may also serve as mounting pieces for components or fixtures of the conveyance, as further described. The four upright members which extend from lower junction blocks to upper junction blocks. The lower ends of the upright members terminate at or extend through the lower junction blocks. The upper ends of the upright members may extend through the upper junction blocks and serve as supports or attachment structures for other components or fixtures of the conveyance, as further described. When the frame assembly is folded, the upper junction blocks slide along the lengths of the respective upright members.

In accordance with one general aspect of the invention, there is provided a collapsible conveyance which has a plurality of interconnected frame members, including side members which are hinge or pivot connected at an intersecting point, and upright members located at ends of the side members, the side members and upright members connected to upper and lower junction blocks, to form a frame assembly, the junction blocks being configured for attachment of one or more fixtures or components for mounting a conveyance such as a wheel to the frame assembly through the junction block.

And in accordance with another aspect of the invention, there is provided a folding transport chair which has a frame assembly having four upright members and crossing pairs of side members between the upright members; upper and lower junction blocks located at intersections of the upright members and side members, the upright members passing through respective upper junction blocks; a hinge in each of two of the upright members, the hinge shaped to pass through the upper junction block through which the upright member passes, and a wheel assembly attached to a distal end of each of the four upright members, the wheel assembly comprising a wheel mounted upon an axle attached to a wheel fork, and a shank which extends from the wheel fork.

These and other general and more specific aspects of the invention are herein described in particular detail with reference to the accompanying Figures illustrating preferred and alternate embodiments of the invention.

DETAILED DESCRIPTION OF PREFERRED AND ALTERNATE EMBODIMENTS

With reference to the Figures, there is shown a collapsible or foldable conveyance, transport chair or wheelchair indicated generally at 100. Although shown and described with reference to the general form of a wheeled chair, for accommodating a human in a sitting position and transport by rolling wheels, the design principles of the invention are applicable to all types devices and assemblies for convenient and portable transport of people or cargo of any type. The types of foldable conveyances or vehicles which can be constructed in accordance with the invention include, without limitation, carts, baby and child strollers, dollies, powered chairs, standard wheelchairs, walkers and other ambulatory support devices, transport chairs, sleds equipped with skis or skids, and wheel or roller equipped and having other holding devices such as receiving bins, bag holders or other receptacles.

Figure 1:
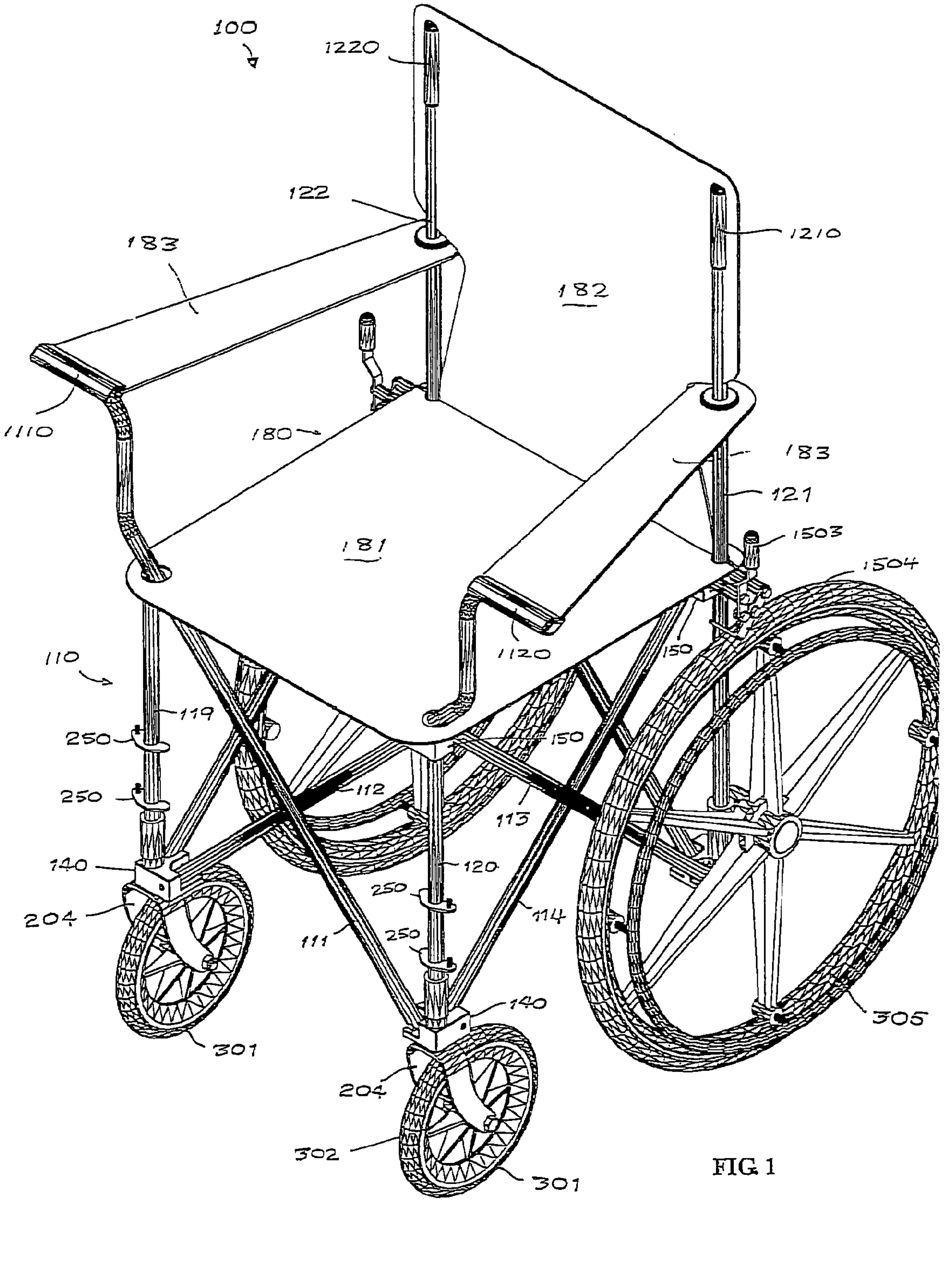
FIG. 1 is a perspective view of a collapsible conveyance of the present invention.
Figure 2:
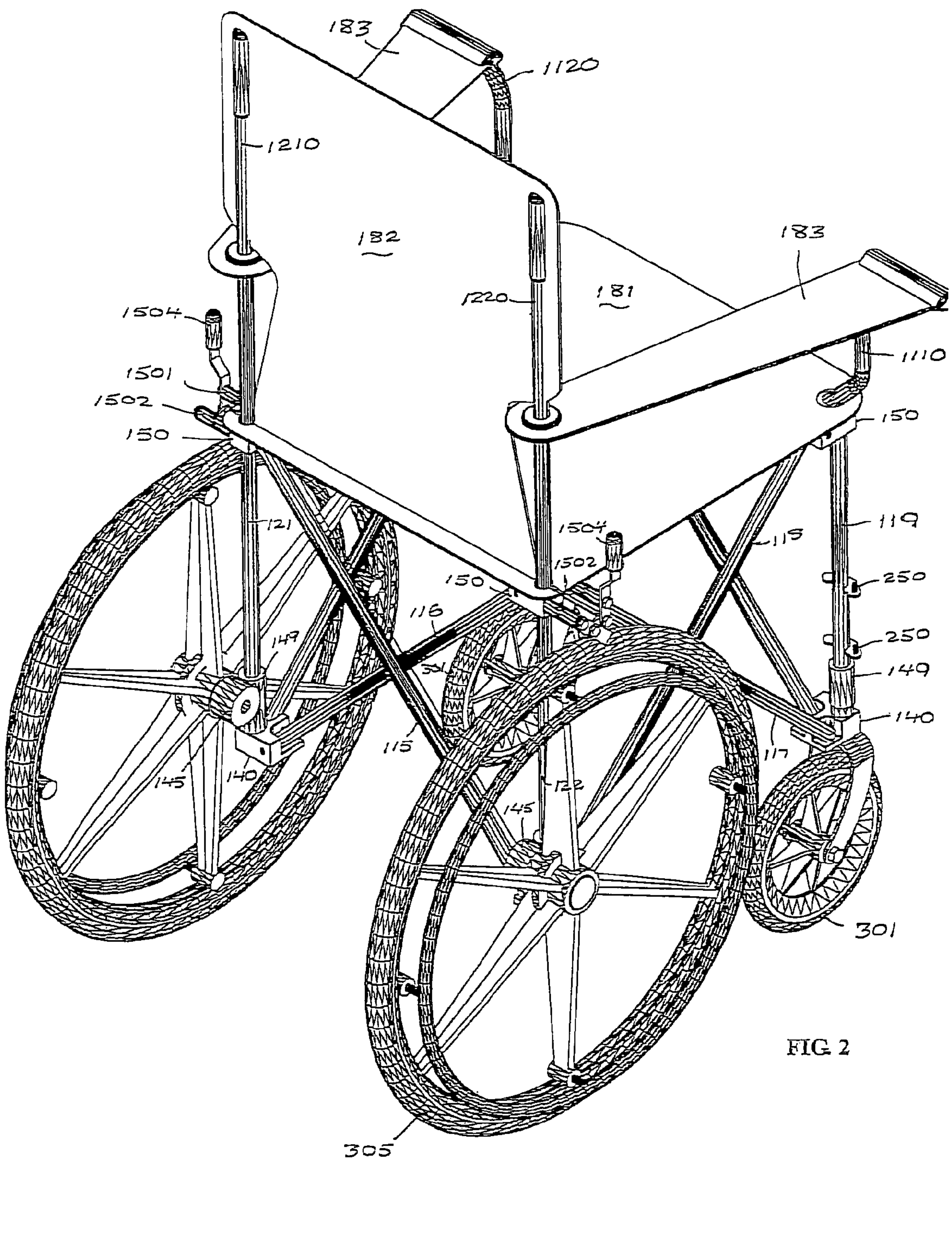
FIG. 2 is perspective view of a collapsible conveyance of the present invention.
Figure 3:
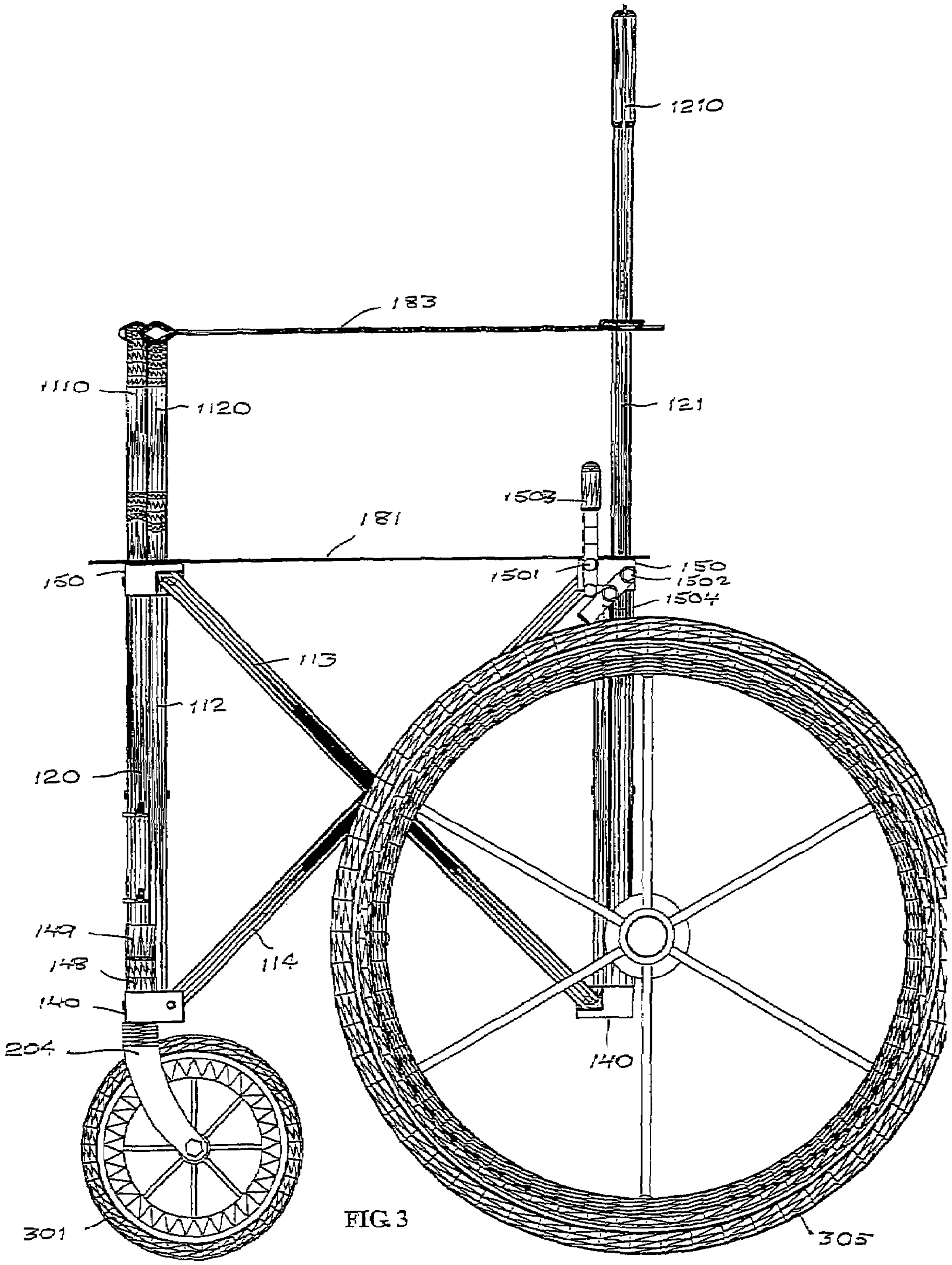
FIG. 3 is an elevation view of a collapsible conveyance of the present invention.
Figure 4:
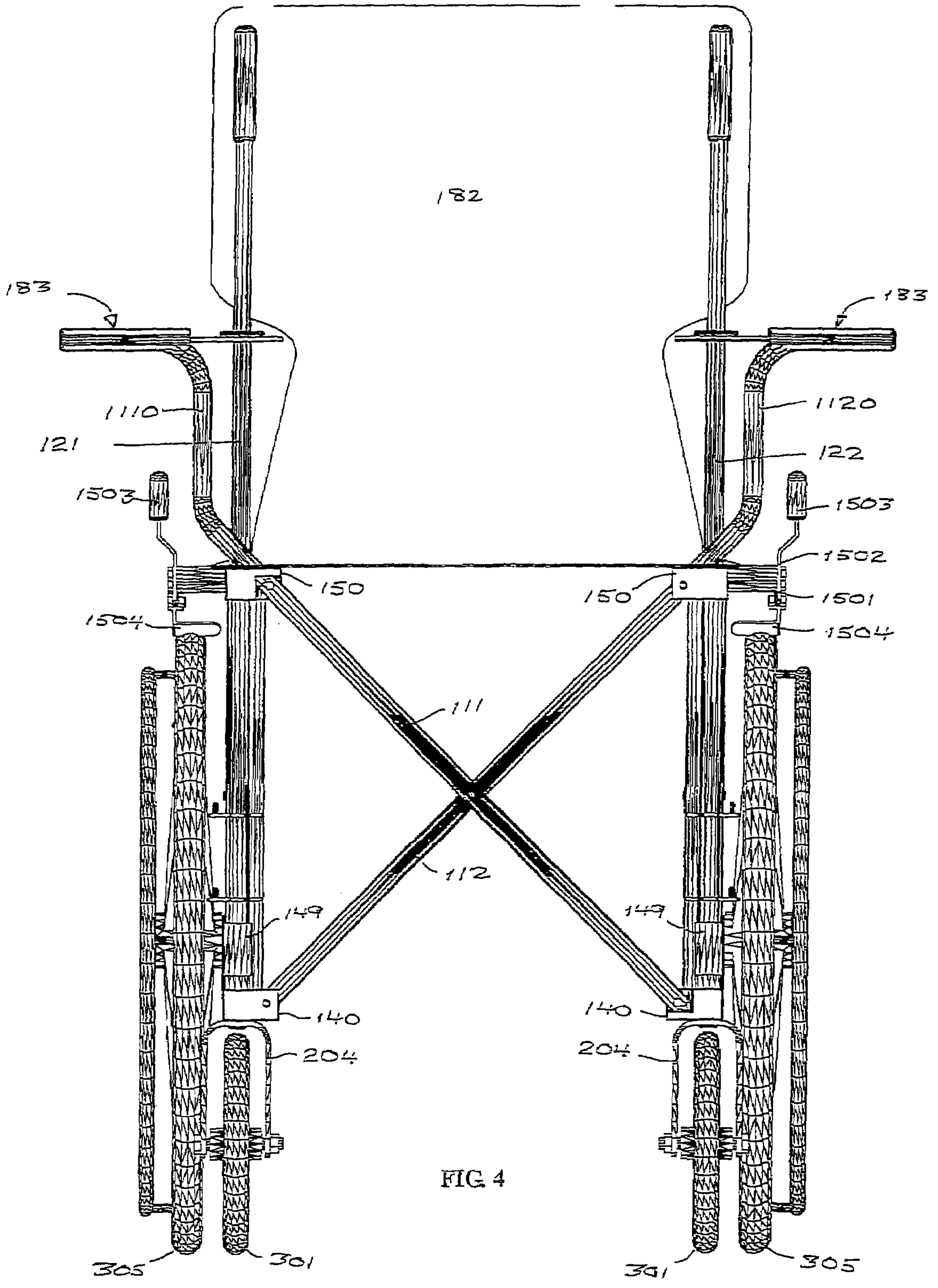
FIG. 4 is an elevation view of a collapsible conveyance of the present invention.
Figure 5:
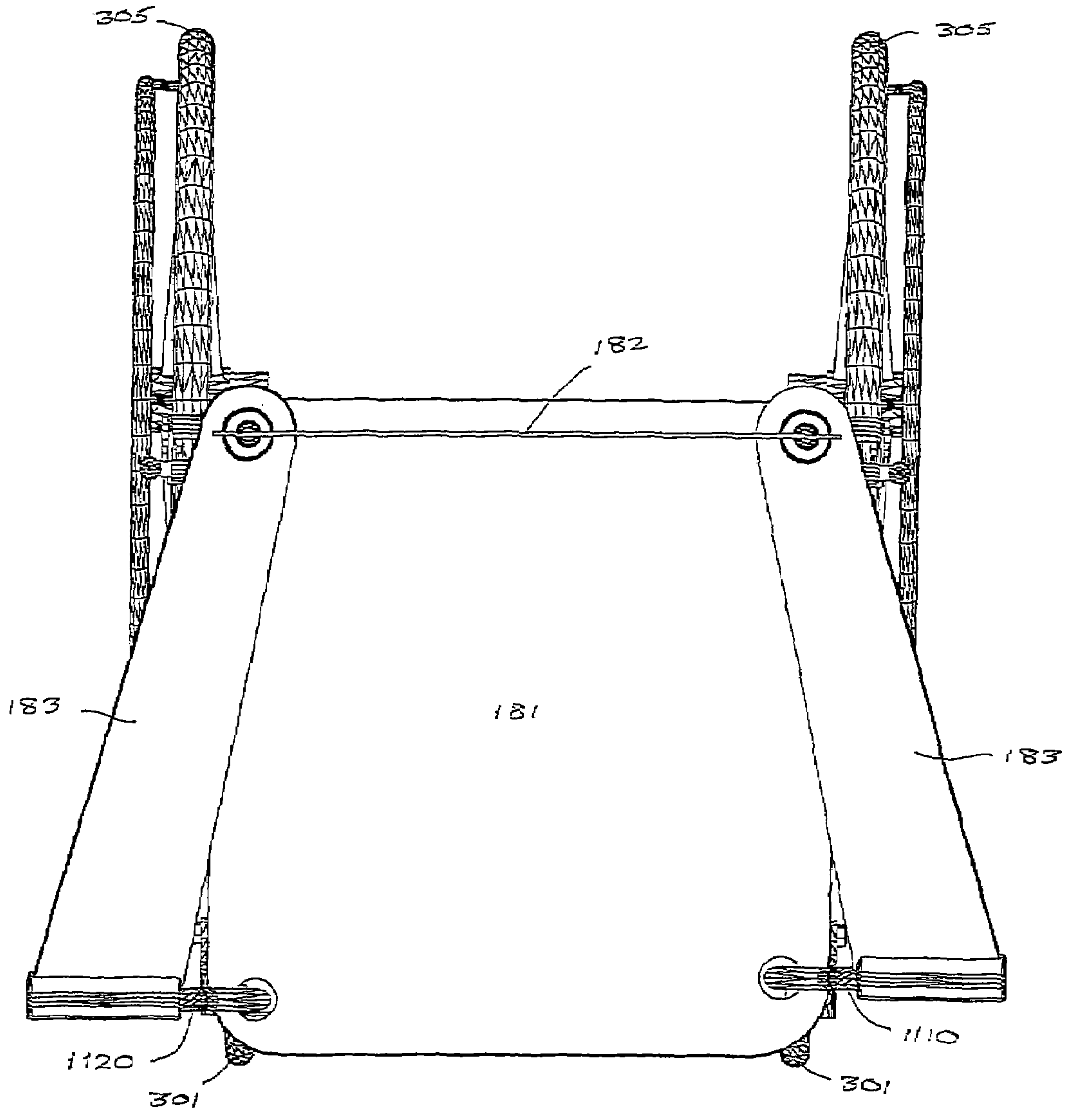
FIG. 5 is a top view of a collapsible conveyance of the present invention.
Figure 6:
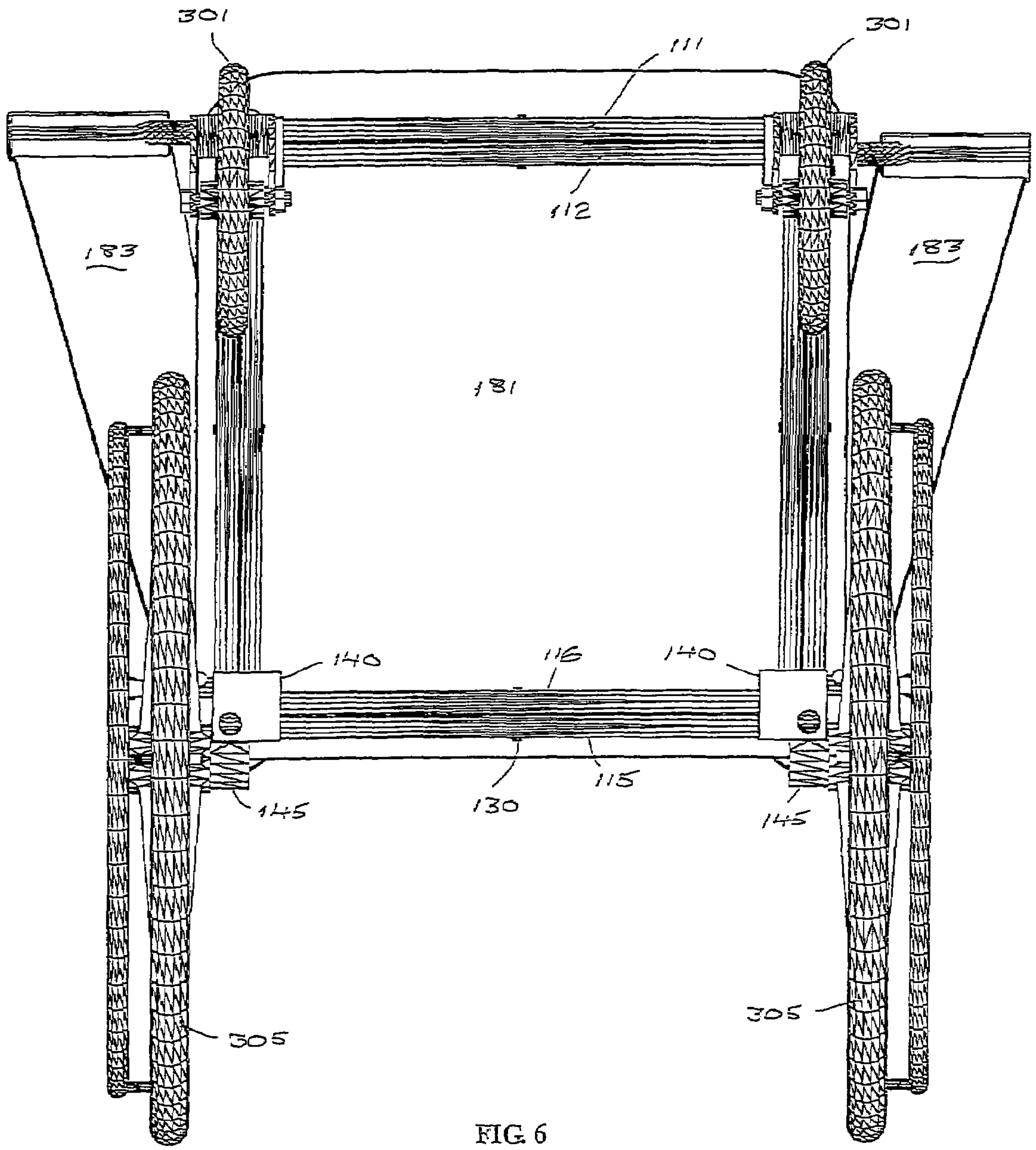
FIG. 6 is a bottom view of a collapsible conveyance of the present invention.
Figure 7:
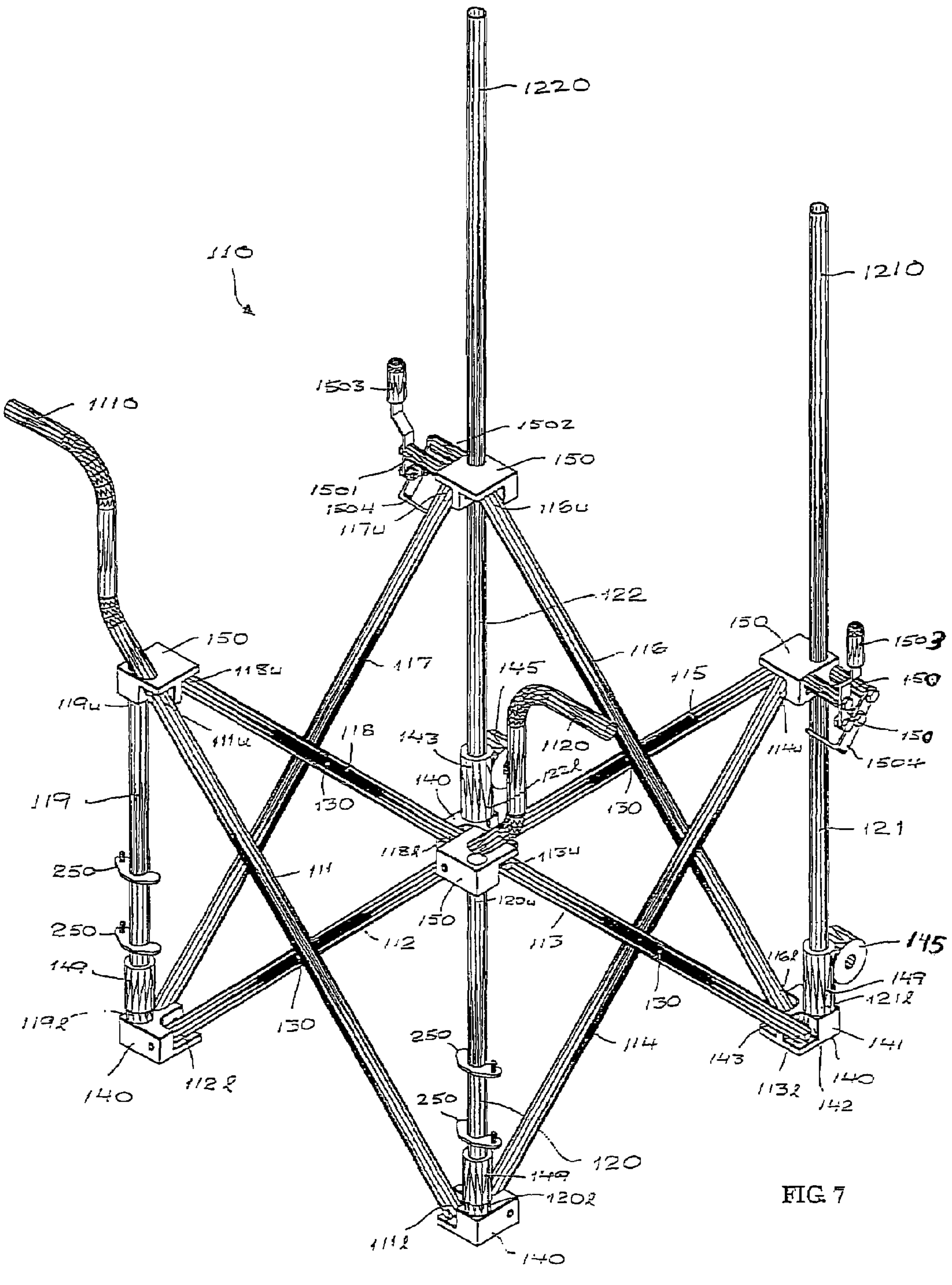
FIG. 7 is a perspective view of a frame assembly of a collapsible conveyance of the present invention.
Figure 8:
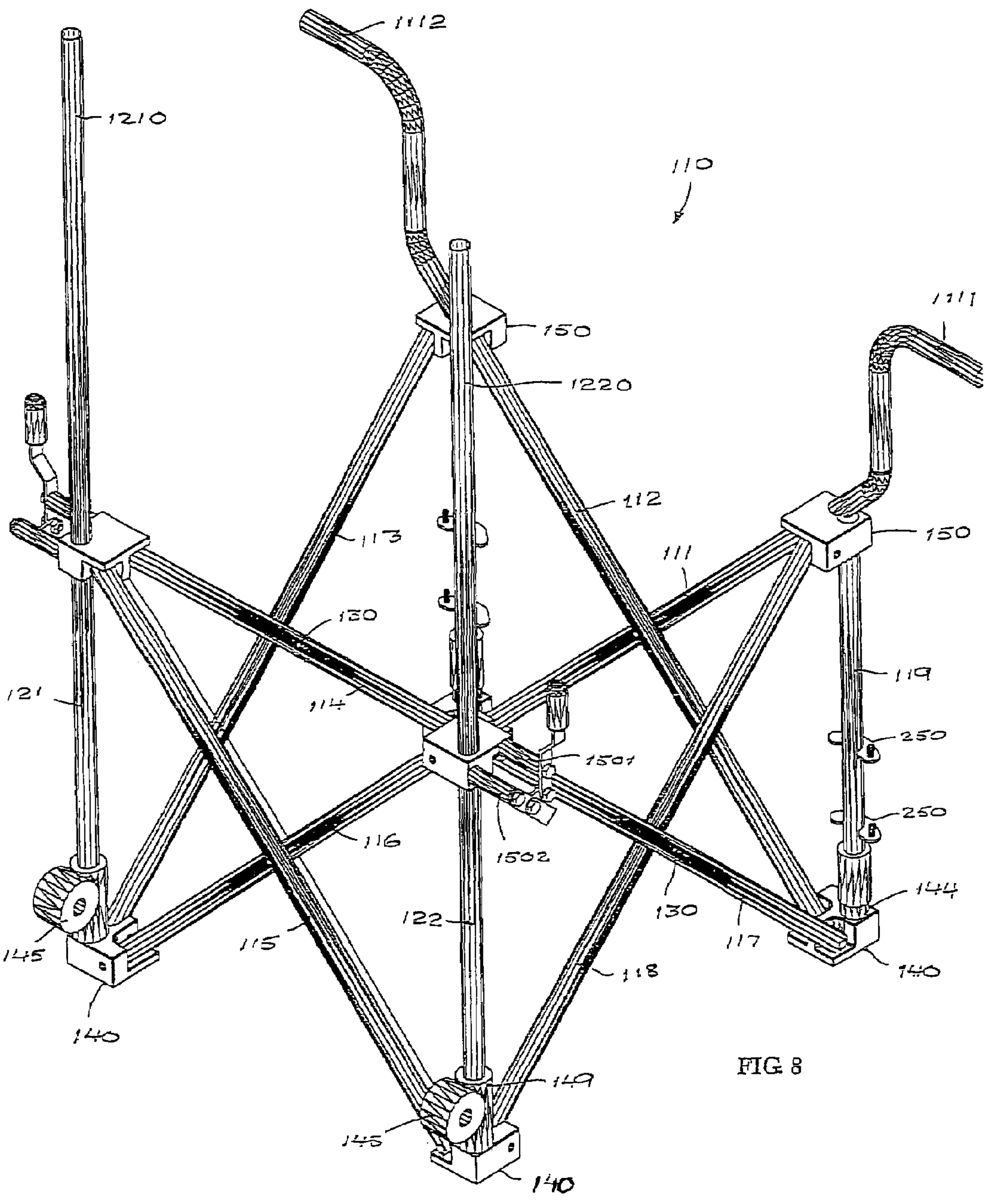
FIG. 8 is a perspective view of a frame assembly of a collapsible conveyance of the present invention.
Figure 9:
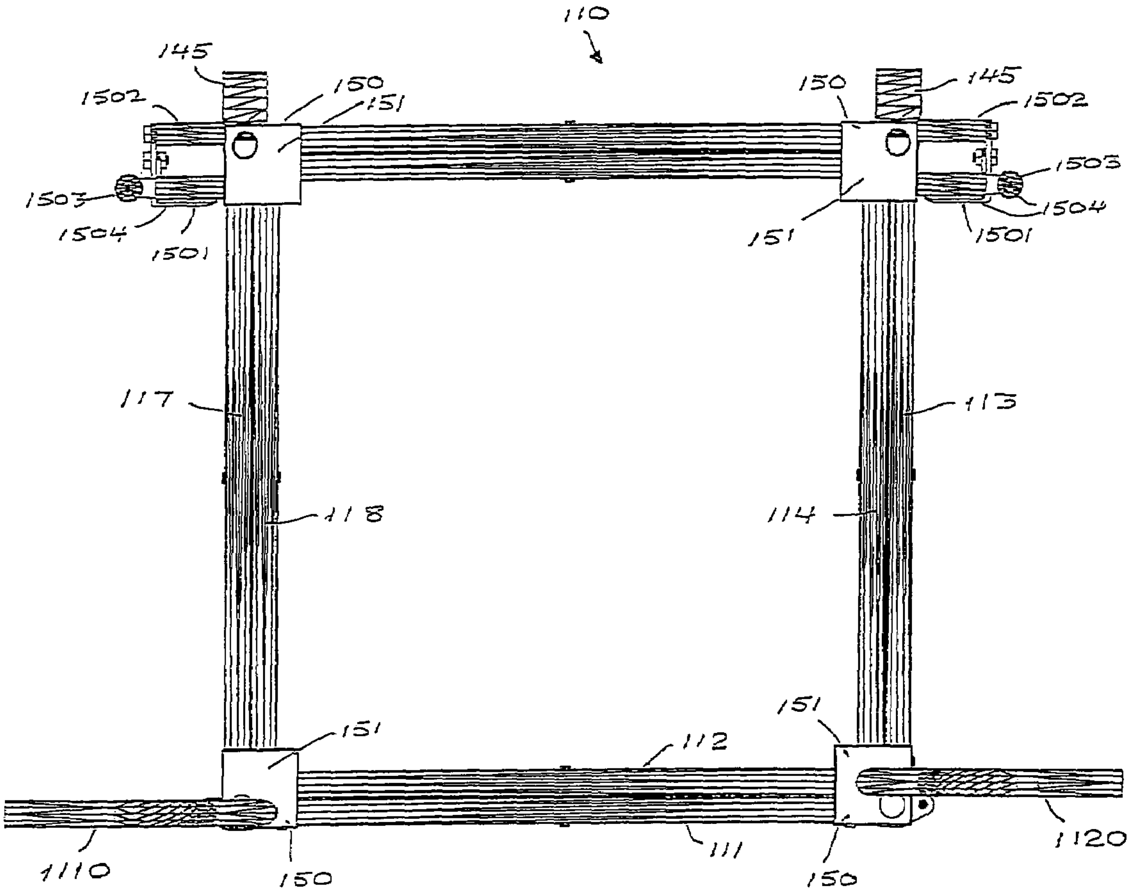
FIG. 9 is a top view of a frame assembly of a collapsible conveyance of the present invention.
Figure 10:
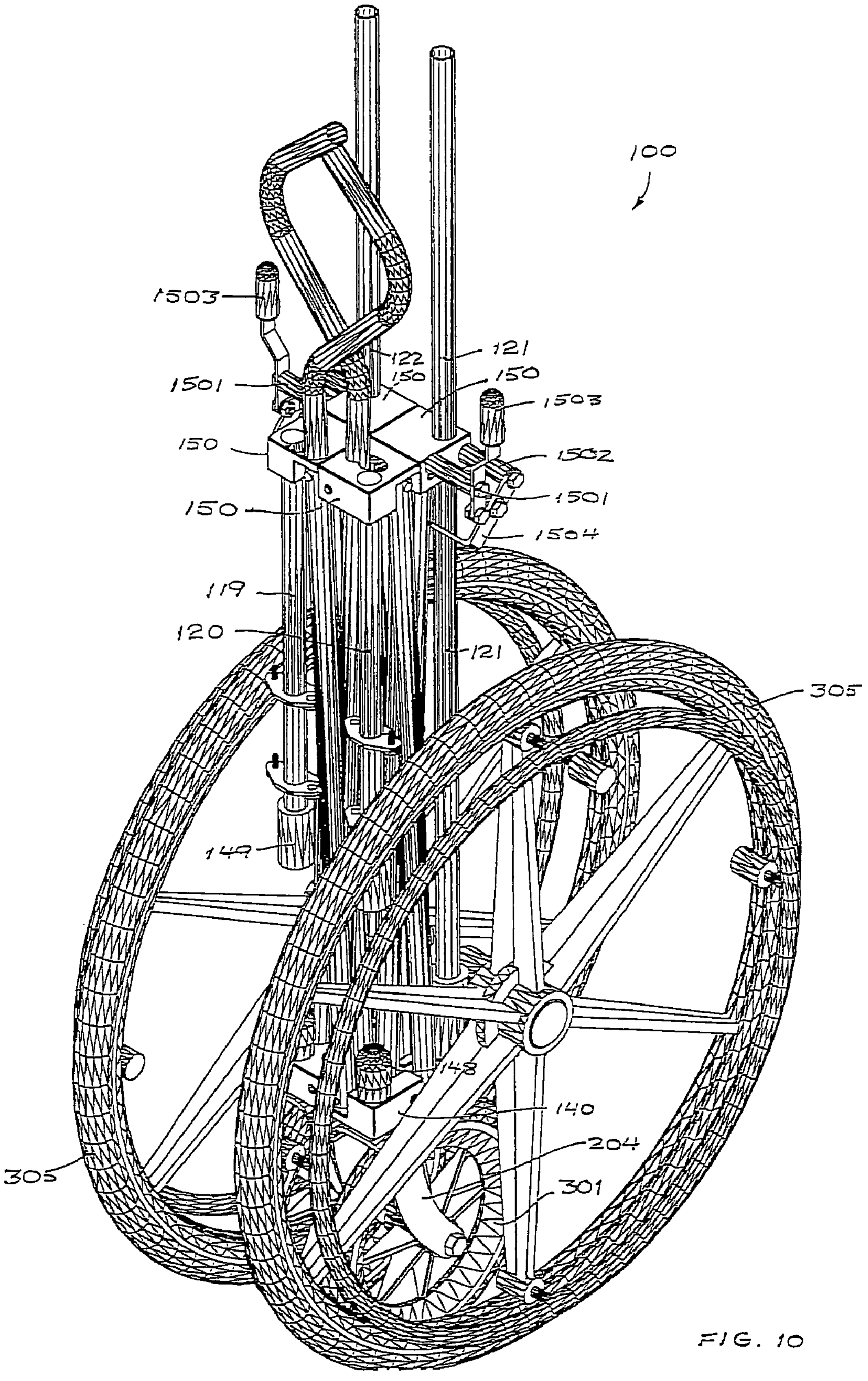
FIG. 10 is a perspective view of a collapsible conveyance of the present invention, in a collapsed or folded configuration.
Figure 11:
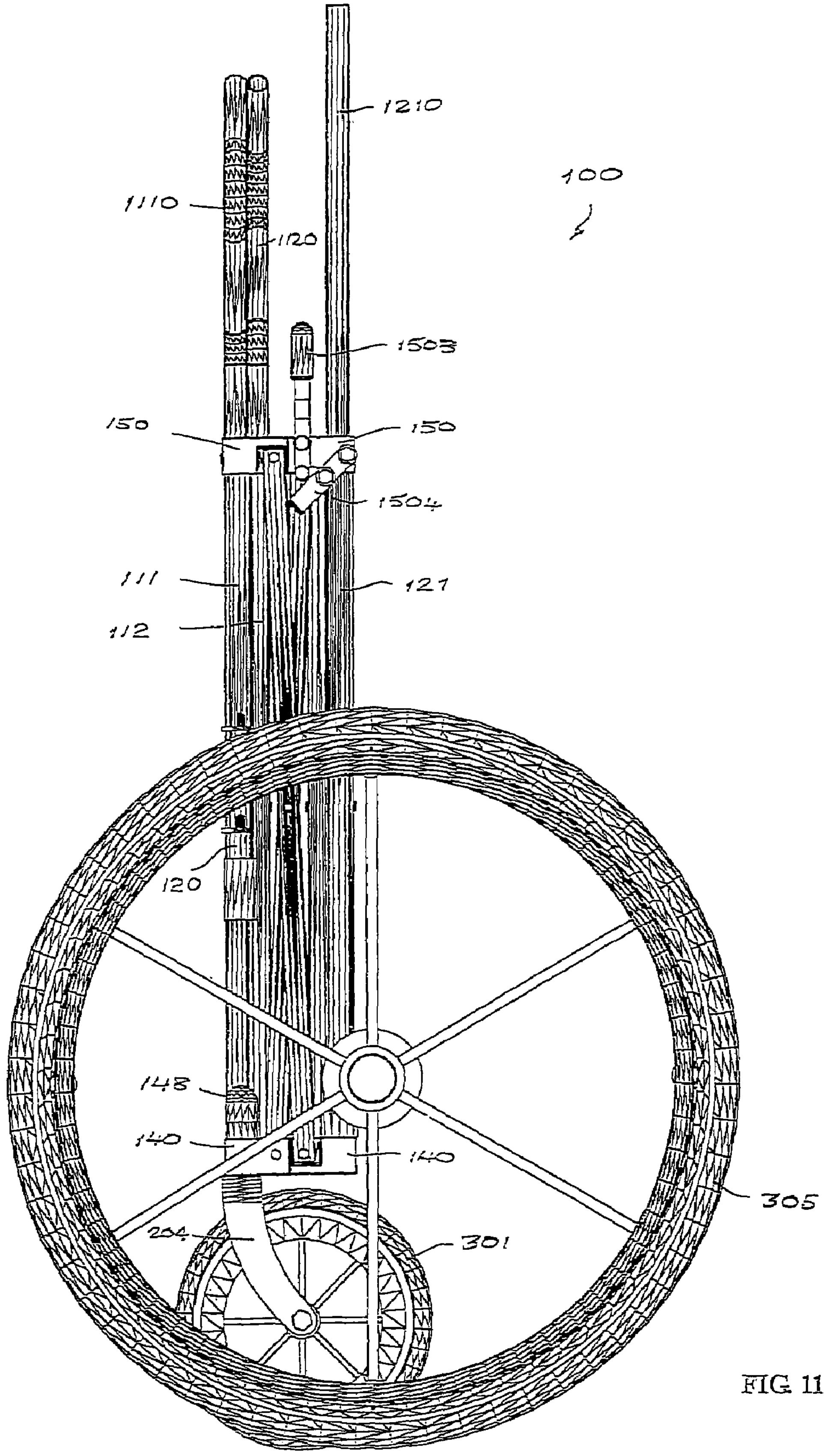
FIG. 11 is a side elevation view of a collapsible conveyance of the present invention, in a collapsed or folded configuration.
Figure 12:
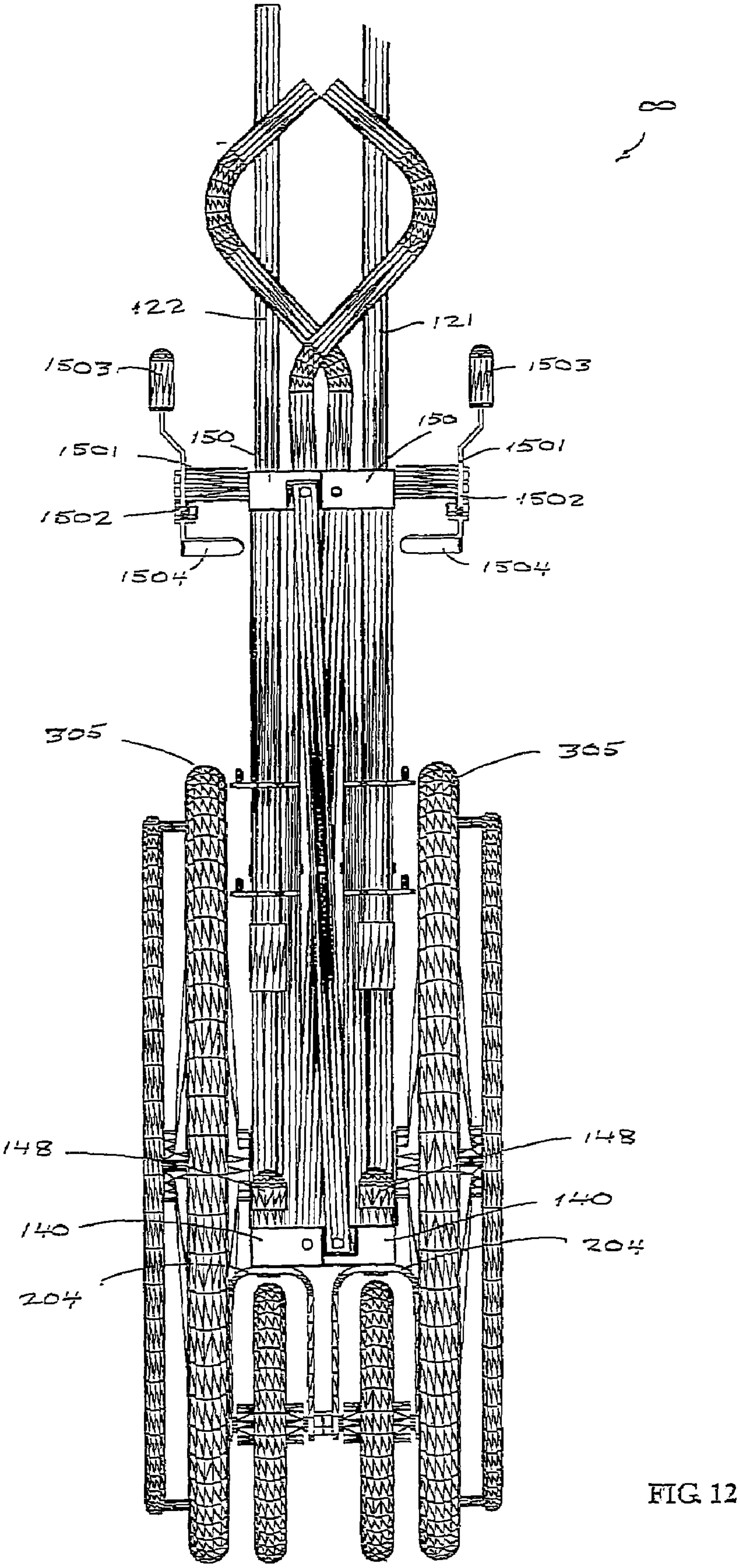
FIG. 12 is a side elevation view of a collapsible conveyance of the present invention, in a collapsed or folded configuration.

The collapsible conveyance 100 includes in a basic form a frame assembly 110 which includes multiple, e.g., ten to twelve, interconnected frame members 111-122, as most clearly shown in FIGS. 7 and 8. The frame assembly 110 has multiple interconnected frame members including front and rear upright members at corners of the frame assembly, and side members in interconnected pairs spanning between each side of the upright members. In one particular embodiment, the frame assembly 110 has four sides formed by the crossing pairs of frame side members 111-112, 113-114, 115-116 and 117-118. Each of the pairs of side members are connected at an axial or pivotal joint 130, for example in the form a pin which extends through a cross-section of each of the two intersecting members. The pin joints 130 enable swivel movement of the two joined side members, to allow repositioning and orientation of the axes of the side members relative to each other, e.g. to a folded position or condition wherein the side members are substantially parallel, as shown in FIGS. 10-12.

Four upright members 119-122 are located at the edges or ends of the frame sides formed by side members 111-118, defining the corners of the generally rectangular frame assembly 110. The lower ends of the frame side members, 1111-1181, and the lower ends of the upright members 119-1221, are connected to lower junction blocks 140. The lower ends of side members 1111-1181 are attached to the lower blocks 140 by pins or other hinge structure to swing relative to the blocks for movement into and out of the folded configuration, whereas the lower ends 1191-1221 of the upright members may be fixedly or removably attached to the blocks. The fixed attachment of the upright members can be accomplished mechanically by a fastener or compression type fitting to advantageously avoid welding or brazing, which is a much more expensive way to manufacture. This in combination with the moving joint connection of the intersecting side members provides a collapsible conveyance which can be manufactured without requiring any welding, brazing or other form of fused metal bonding. This results in substantially reduced costs of manufacture, and provides a collapsible conveyance which has wide economical applicability. The use of composite synthetic materials for the component parts of the frame members and junction blocks further reduces the cost of manufacture of the invention, making it practical for the lower end retail and even disposable markets.

A support structure 180 is attached to the frame assembly 110 for supporting a load to be carried by the collapsible conveyance, transport chair or wheelchair. As illustrated, the support structure 180 has a generally horizontal component 181 and a generally vertical component 182, and side support components 183. However, the support structure 180 may be configured in other forms. such as substitution of the horizontal component 181 with a basket-like shape which extends down into the interior of the frame assembly 110, for use as an article transport device rather than a transport chair. Also, the generally vertical component 182 may be angled back by modification of the upright members 121, 122, for use as a stroller or movable leisure or transport chair. The material of the components of the support structure 180 may be fabric or other flexible material such as plastic type sheet material (vinyl), or manufactured from other semi-rigid or even rigid materials.

The upper ends of the side members, 111*u* and 118*u* are connected to upper junction blocks 150. The upper ends of the upright members, 119*u*-122*u*, are connected to the upper junction blocks 150 and/or extend through the upper junction blocks 150. The side members 111-118 together with the upright members 119-121 and the junction blocks 140, 150 provide a strong collapsible frame which can be equipped with multiple types of conveyances in accordance with the invention. The ends of the side members and upright members which terminate at or intersect with the junction blocks are referred to as the "terminal ends", even though the side members or upright members may extend through and beyond the junction blocks as shown.

The design of the junction blocks 140, 150 to serve as points of attachment for other components or fixtures for attachment to the frame assembly enables the utility of the invention as a conveyance device in addition to the load carrying function. The lower junction blocks 140 are designed to accomplish mounting of various types of conveyances to the frame assembly 110. For the embodiment of a wheeled conveyance, such as a wheeled chair as illustrated, the forward positioned lower junction blocks 140 are configured to receive the lower ends of upright members 119 and 120, and side members 111, 112, 114 and 117, and to serve as amounting structure for a conveyance such as forward wheels 301, or a conveyance mounting structure such as wheel forks 204. The wheel forks 204 are preferably mounted upon a vertical pin to allow the fork to swivel 360 degrees relative to the junction block 140, but a fixed wheel mount can also be used.

The junction blocks 140 and 150 are preferably identically configured, or can be made in universal or right/left forms to receive and engage the ends of the intersecting frame members at each block and to receive and engage the conveyance attachment (on lower blocks 140) or other components at blocks 150 as further described. For example, the lower junction blocks 140 have a body 141 in which a first recess 142 is formed for receiving an end of a first frame side member, and a second recess 143 for receiving an end of a second frame side member. A third recess or receptacle or attachment point 144 is formed in the block 140 for receiving the lower end of an upright frame member. This third recess or attachment point 144 may be for example in the form of a bore, or may alternatively be a projection such as a pin or rod which projects upward from the block 140 for axial insertion into the upright member. The pin or rod may be integrally formed with the block 140, or inserted into or fastened or welded to the block 140. The body 141 may be extended or otherwise modified above or below the points of attachment of the frame members to accommodate any type of conveyance which may be attached to the block 140, such as other types of wheels or wheel mounts, casters, skids or skis, treads or any other type of conveyance device which makes the frame assembly 110 mobile. There may also be a mechanical interconnection between the blocks 140 and the conveyance or drive mechanism thereon, such as a motor mounted on one block or frame member with a drive connection or link to the conveyances mounted to on one or more of the junction blocks, or motors mounted within one or more of the wheels.

The upper surface of the block body 141 can also be configured or used as a platform for attachment of fixtures for the attachment of conveyances or conveyance mountings. In the embodiment shown, the junction blocks 140 are each configured with a bullet nose 148, shown in FIGS. 10-13, over which receiving ferrules 149 or cylinders on the lower ends 1191 and 1201 of uprights 119, 120 fit when the frame is in the uncollapsed configuration. Alternatively, uprights 119, 120 can be constructed to mount permanently to the upper surfaces of the junction block bodies 141 and to telescopically change in length, by telescope or other mechanical arrangement, between the uncollapsed and collapsed configurations. The engagement of the front upright members 119, 120 with the lower junction blocks substantially stiffens the frame assembly 110, providing weight-bearing structure directly over the front wheel forks 204 or other conveyances which may be attached to the junction blocks 140. For a wheelchair or transport chair, the front upright members 119, 120 are a preferred mounting structure for attachment of foot rests to brackets 250 which are secured directly, as for example by welding, brazing or fastener connection to the upright members 119, 120.

The rear wheel axle journals 145 are mounted or welded to, or integrally formed with the receiving ferrules or cylinders 149 or block body 141. Most preferably, the junction blocks are of unibody construction, wherein a single formed piece is configured to include the attachment points for the various frame members and a mounting structure for the conveyance or conveyance mounting fixture, such as the wheel axle journal 145.

The upper junction blocks 150 are also configured to receive the respective ends of the frame side members and the upright members. The upper junction blocks 150 at the front of the chair, to which upright members 119 and 120 are attached, also receive the upper ends of side members 111, 112, 113 and 118. As illustrated, side members 111 and 112 extend through and beyond blocks 150 to form armrest supports 1110 and 1120. Similarly with respect to the blocks 150 at the rear of the chair, upright members 121 and 122 extend through and beyond the blocks to form supports 1210 and 1220 for the back of the chair. The block body 151 also serves as a core or attachment body for other appendages or fixtures which may extend from the body for other components or features of the collapsible conveyance. For example, extending from the body 151 of the rear block 150 are shafts 1501, 1502 upon which fixtures or mechanisms can be mounted, such as the illustrated wheel brake, having a handle 1503 which operates on a brake bracket 1504 mounted for operative rotation upon shaft 1502 against a wheel or tire as further described. The block body 151 can be made to any size or configuration to accommodate any type of attachment fixtures. Where a junction block is configured for attachment of a fixture or mounting component for mounting of a conveyance, this is regarded as the conveyance being "attached to the junction block" as defined and claimed by this patent. Also, the attachment of conveyances such as wheels directly to the frame assembly 110 at points other than the junction blocks is within the scope of this invention. Identically configured blocks 150 can also be used at the different corners of the frame which will reduce production costs. Increasing the overall size and/or length of the block body 151 increases the rigidity of the frame assembly 110.

The junction blocks 140, 150 perform the multiple functions of interconnecting the side and upright frame members, providing attachment structures and fixtures for conveyance devices to be attached to the frame assembly, and registering and aligning the frame members in the operative uncollapsed configuration, and in the generally parallel folded configuration shown in FIGS. 10-12. As the side frame members 112-118 are rotated about pins 130 into a more parallel arrangement, the junction blocks 140, 150 are drawn together, bringing with them the conveyances or fixtures attached thereto. Conveyance mounting fixtures may be attached to the junction blocks or to the frame members, or integrally formed with the junction blocks. In embodiments where conveyance mounting fixtures such wheel axle journals are integrally formed with the junction block, the fixtures are deemed to be "attached" to the junction block.

In the wheeled chair embodiment of the invention shown in the Figures, the forks 204 attached to the front lower junction blocks 140 are equipped with wheels 301 which are dimensioned to fit substantially under the frame assembly 110, and generally under the upright members 119, 120 to support and guide the load on that part of the frame assembly. The exact location of the axles 302 of wheels 301 relative to the junction blocks 140 is set by the design of forks 204. The swivel mounting of the forks 204 on the underside of the junction blocks 140 locates the wheels 301 under the frame assembly 110, thereby elevating the frame assembly by an extent at least equal to a radius of wheels 301. This provides the advantages of raising the frame assembly 110 for seating and load-carrying access, and placing the wheels 301 in general vertical alignment with the upright members 119, 120 to reduce the profile of the device in the collapsed configuration. As shown in FIGS. 10-12, wheels 301 are positioned below or at the end of the frame assembly 110 in the folded configuration, occupying not much more than the width of the frame assembly in either profile as folded. Alternatively, wheels 301 may be mounted inboard or outboard of junction blocks 140. All of the design features described herein are applicable to either transport type chairs, wheelchairs, or other conveyances, the names of which are used interchangeably herein.

Figure 15:
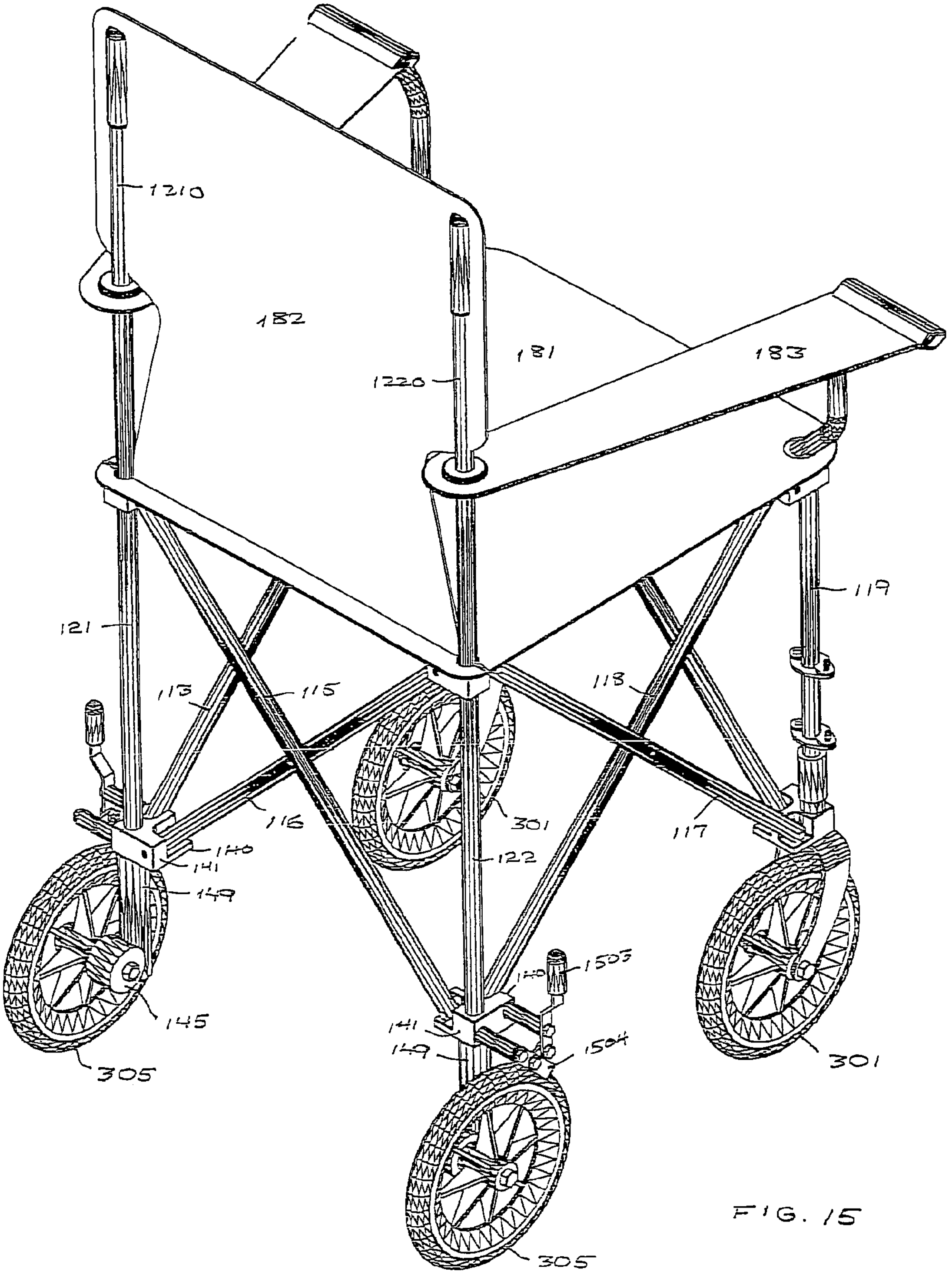
FIG. 15 is a perspective view of a collapsible conveyance of the invention in the form of a transport chair.

Attached to the rear lower junction blocks 140, through axle journals 145, are wheels 305, the diameter of which maybe substantially greater than that of wheels 301 as shown, by mounting outboard of the junction blocks and frame, and being directionally fixed. Alternatively as shown in FIG. 15, the rear wheels 305 may be substantially the same size or diameter as wheels 301, and similarly mounted through axle journals 145 which are located if necessary below the junction blocks 140, by extension of ferrules 149 below the block bodies 141, to provide a collapsible transport type chair.

Figure 13:
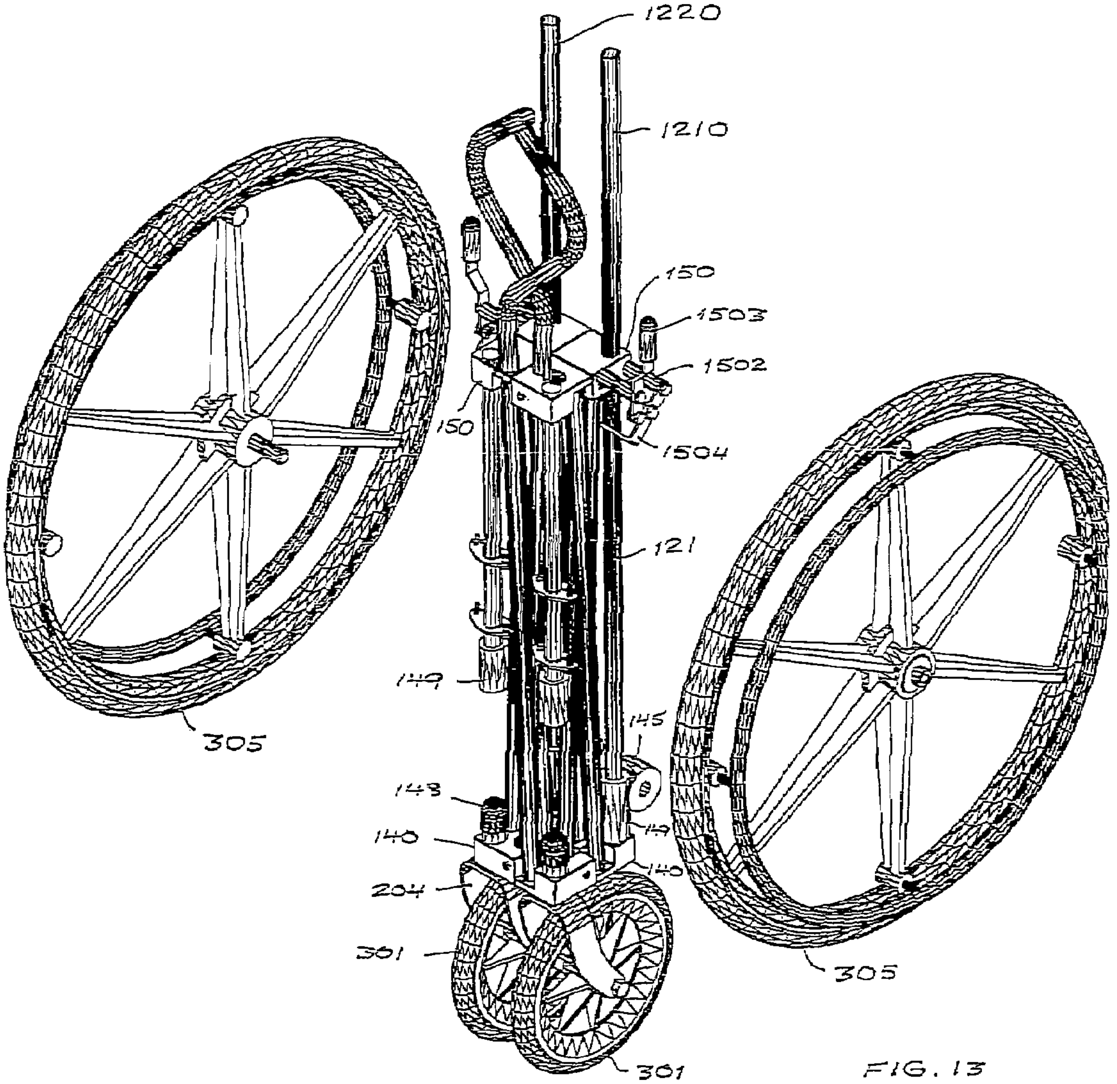
FIG. 13 is a perspective view of a collapsible conveyance of the invention in a collapsed configuration, with two conveyances removed.

As shown in FIGS. 10-12, wheels 305 remain laterally outboard of the respective upright members 121, 122 as the frame assembly 110 is collapsed, and flank the frame assembly 110 and wheels 301 in a laterally outboard location. Wheels 305 may also be equipped with quick-release hubs or quick-release hubs or axles as known in the wheel chair art, for removal from the wheel mounts, as shown in FIG. 13, to further reduce the folded size of the conveyance.

Figure 14:
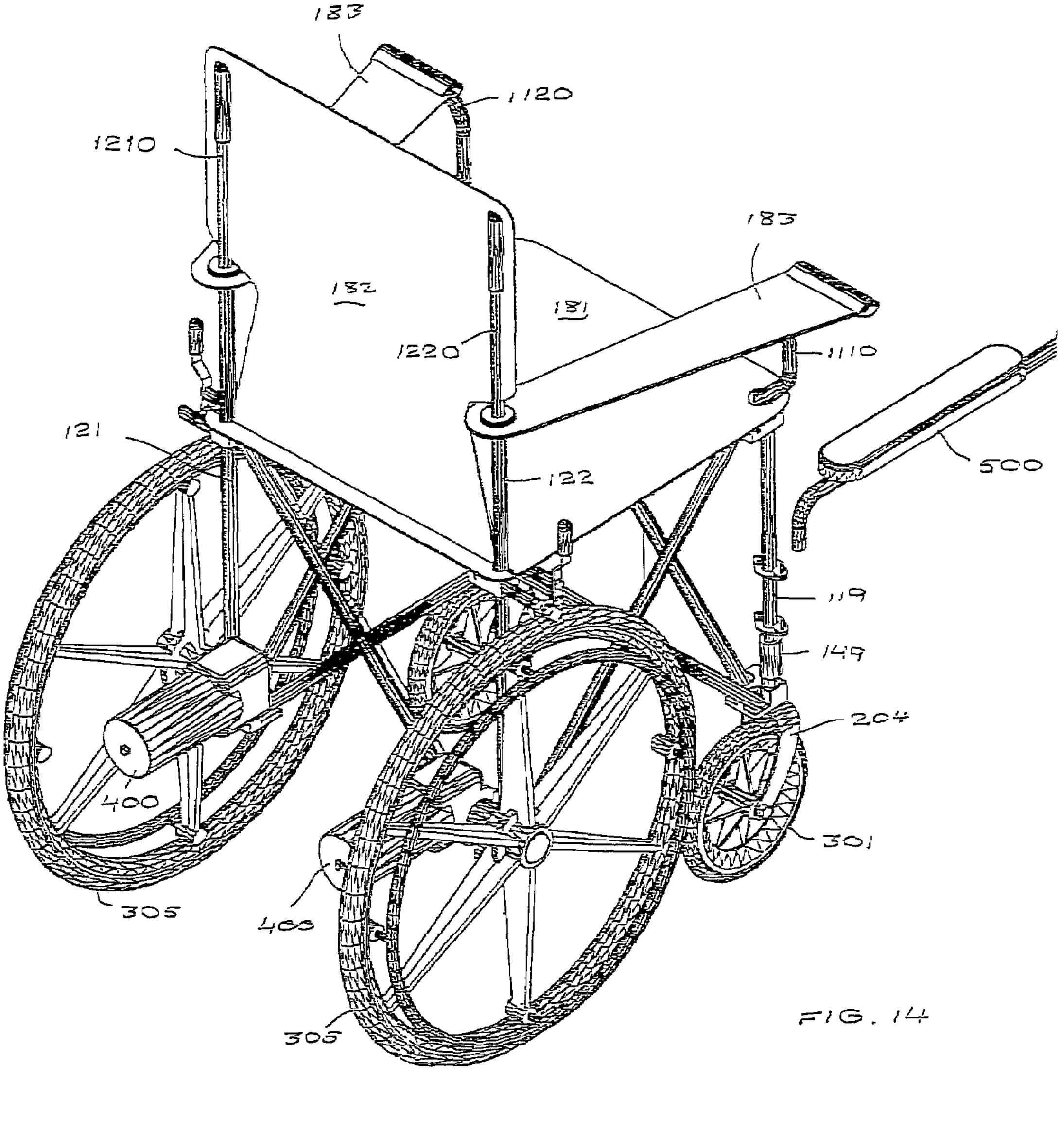
FIG. 14 is a perspective view of a collapsible conveyance of the invention with certain accessories.

FIG. 14 illustrates certain accessories which may be added to or incorporated into the collapsible conveyance. These include for example motorization of one or more of the wheels, such as rear wheels 305 by one or more motors 400, such as any suitable DC motor, secured for example to the frame assembly proximate to junction blocks 140 and operatively connected through a gear box or other linkage to drive the wheel axle in forward or reverse. The motor 400 may be mounted in a manner to avoid interference with the frame members when collapsed to the folded configuration.

FIG. 14 also illustrates a rigid arm accessory 500 which can be provided for attachment to the frame assembly 110 by, e.g. connection to the rear upright members 121, 122 and connection to the side member ends 1110 and 1120. Other forms of accessories or attachments can be provided for connection to the frame assembly 110 by intersection with or extension of the frame members, or by clamping about the frame members. For example, clamps 250 are secured about upright members 119 and 120 for mounting of conveyances such as wheels, or foot rests or other accessories when the conveyance is used as a wheelchair. The clamps 250 can be of the type which are rotationally locked by interface with a detent or key lock through a wall of the frame member to prevent rotation of an accessory or conveyance mounted thereto. These types of clamps which attach about the exterior of a cylindrical tube can be used for mounting of conveyances directly to the frame assembly 110, preferably proximate to the upper or lower junction blocks, as an alternative to mounting of conveyances to the junction blocks.

Figure 16:
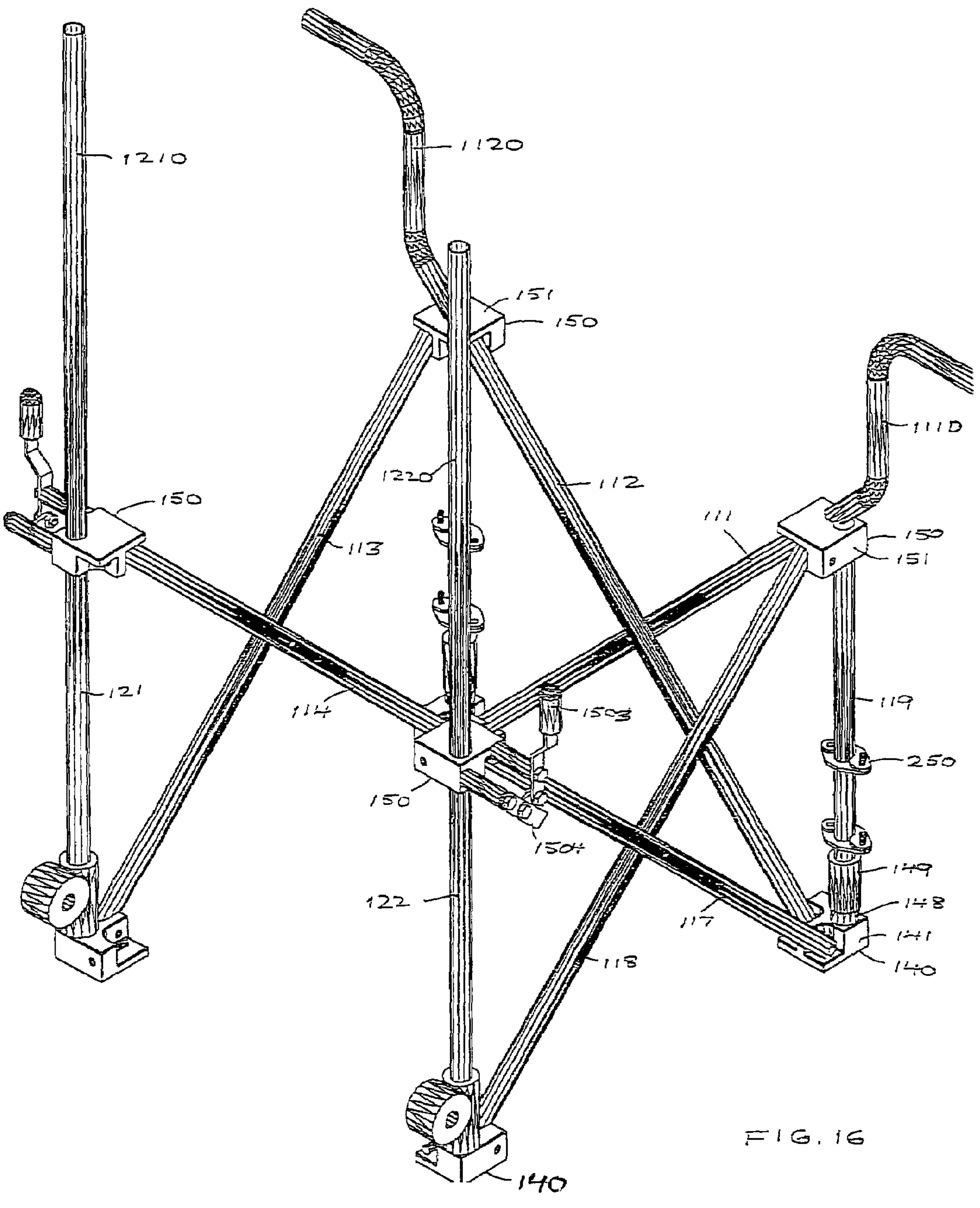
FIG. 16 is a perspective view of an alternate embodiment of a collapsible conveyance of the invention.

As shown in FIG. 16, the collapsible conveyance of the invention can also be constructed to function as a commode type transport or positioning chair, by removing the rear side members 115 and 116, which allows the frame assembly 110 to fit around a toilet, and the seat support on the frame to be suspended over the toilet. In this embodiment, it is preferred to structurally enhance the upper and lower junction blocks 140, 150 at the rear of the chair to adequately resist twisting of the frame assembly 110 as a result of the absence of side members 115 and 116. This can be done by making the block bodies 141 larger, to engage a larger section of upright members 121 and 122, by increasing the size of ferrules 143, and/or providing ferrules or other structural reinforcement along uprights 121, 122 where they intersect the upper junction blocks 140.

Figure 17:
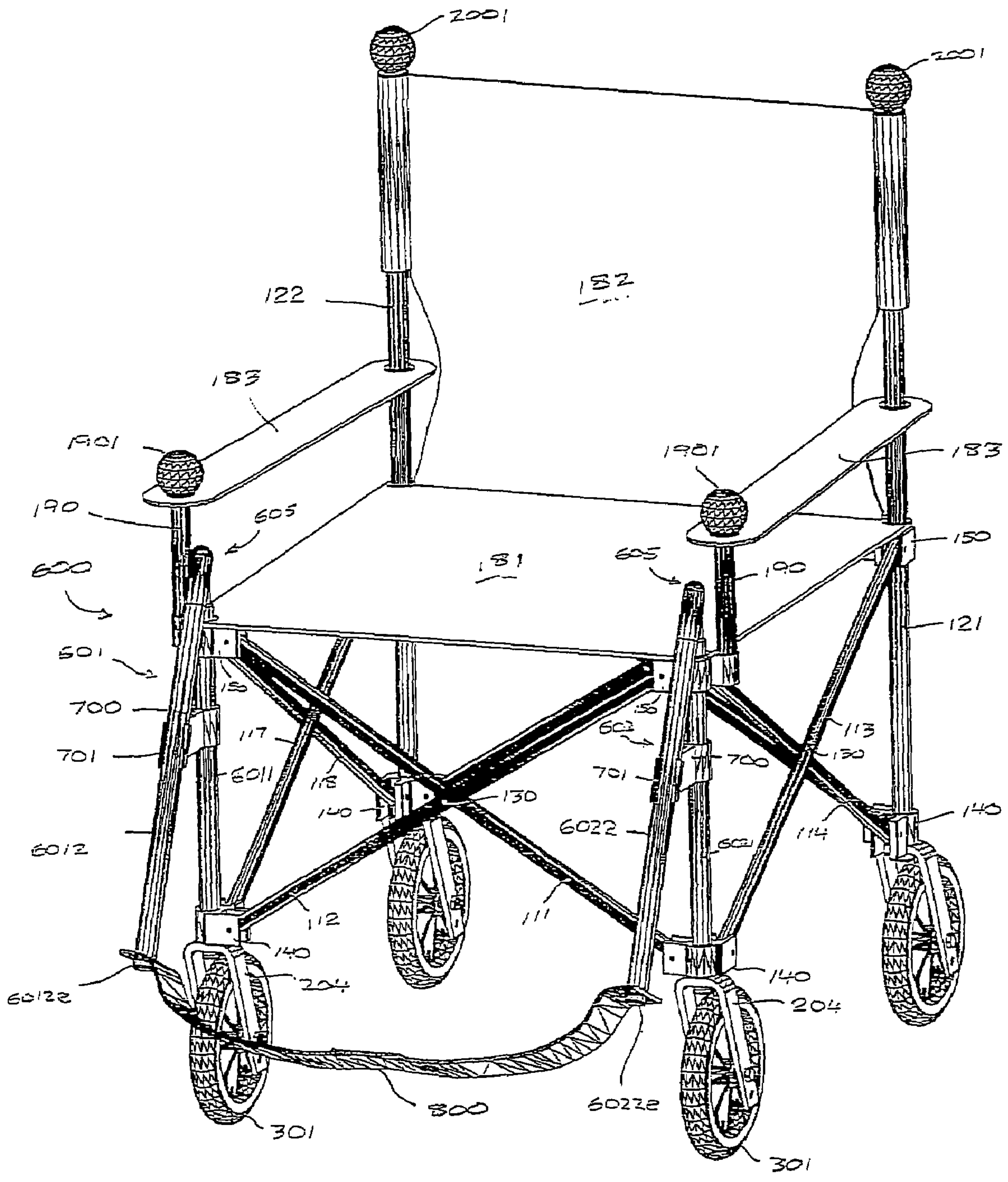
FIG. 17 is a perspective view of an alternate embodiment of a collapsible transport chair of the present invention.
Figure 18:
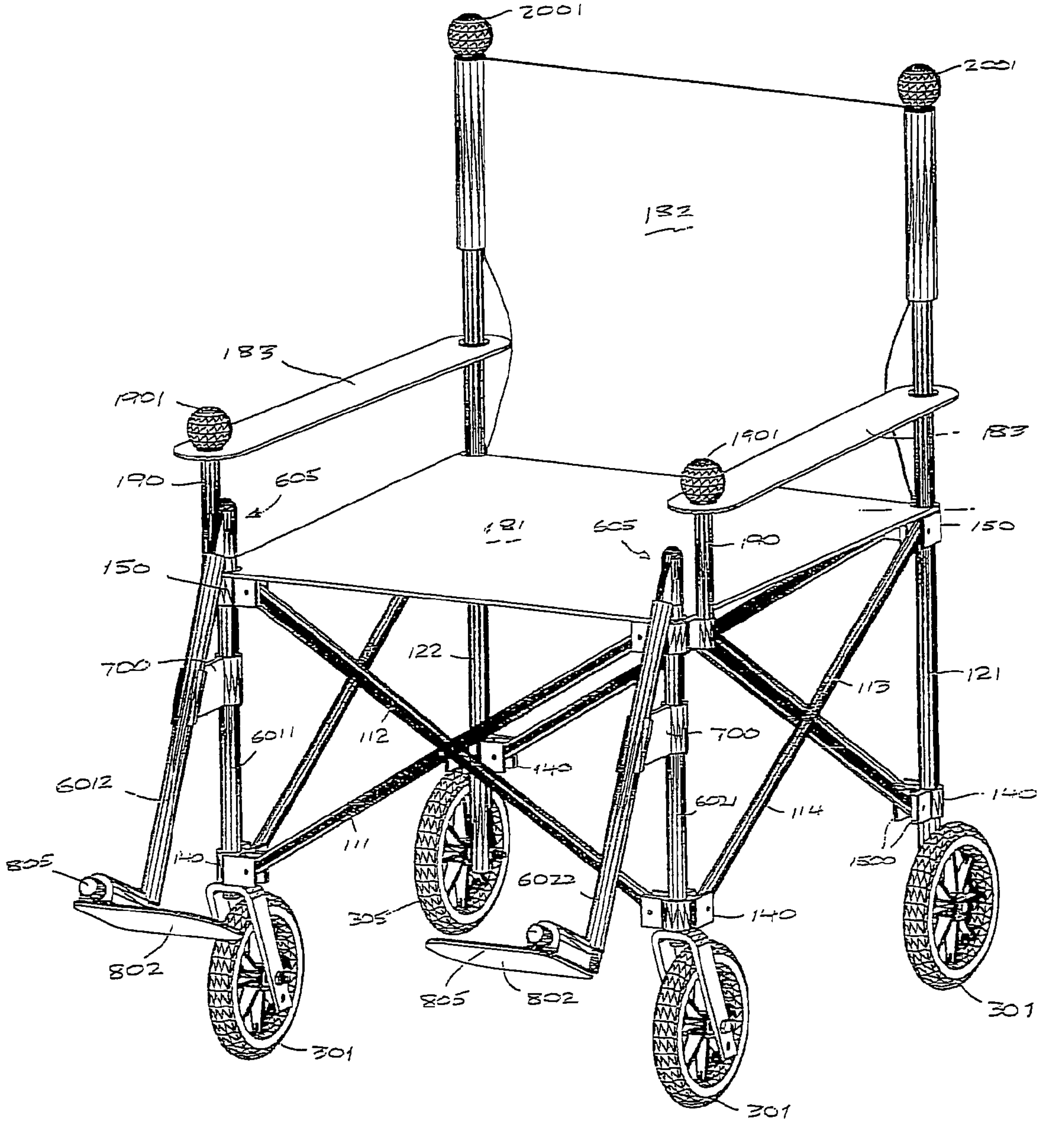
FIG. 18 is a perspective view of an alternate embodiment of a collapsible transport chair of the present invention.

FIG. 17 illustrates another embodiment of a collapsible conveyance, transport chair and wheelchair of the invention, shown in an unfolded operative configuration. This embodiment of the chair has a frame assembly 600 which has four sides defined by crossing pairs of frame side members 111-112, 113-114, 115-116 and 117-118, each of the pairs of side members being connected at an axial or pivotal joint 130, for example in the form of a pin or rivet which extends through a cross-section of each of the two intersecting members. The pin joints 130 enable swivel movement of the two joined side members to allow repositioning and orientation of the axes of the side members relative to each other, e.g. to a folded position or condition wherein the side frame members are substantially parallel, as shown in FIG. 18. The frame assembly 600 has rear upright members 121 and 122 located at opposite rear corners and intersecting with the frame side members 113-114, 115-116 and 117-118 through upper and lower junction blocks 140, 150, as further described. Specifically, lower ends of the rear upright members 121 and 122 terminate at a lower junction block 140 which also receives a terminal end of each of the respective frame side members, the lower junction block 140 at the lower terminal end of rear upright member 121 receiving a terminal end of frame side members 114 and 116, and the lower junction block 140 at the lower terminal end of rear upright member 122 receiving a terminal end of frame side members 115 and 118. The rear upright members 121 and 122 pass through and slide relative to the upper junction blocks 150, which slide over a length of the rear upright members 121, 122 when the frame is transformed between folded and unfolded configurations.

Figure 25B:
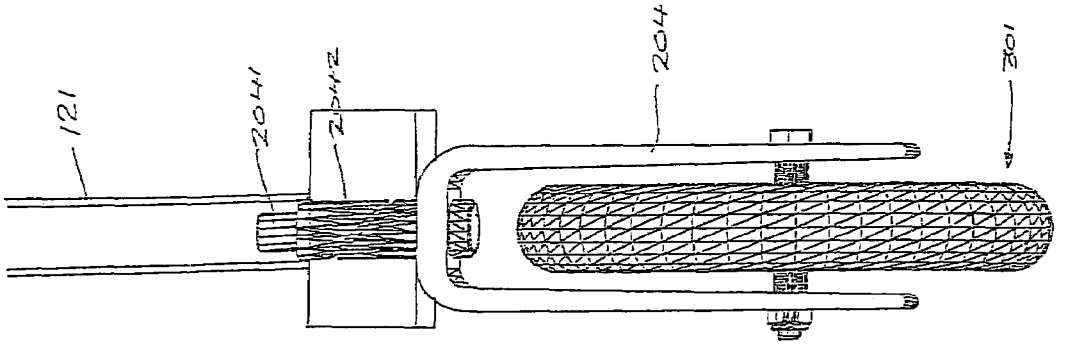
FIGS. 25A-25B and 26A-26B are perspective views of wheel assemblies of the invention.
Figure 25A:
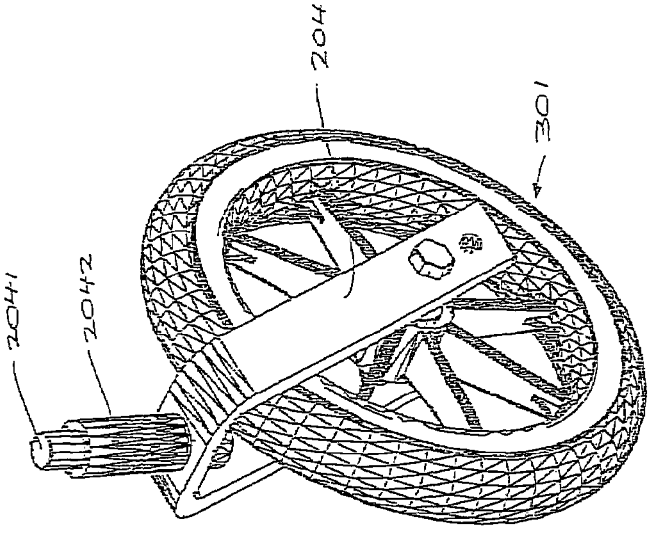
Figure 26B:
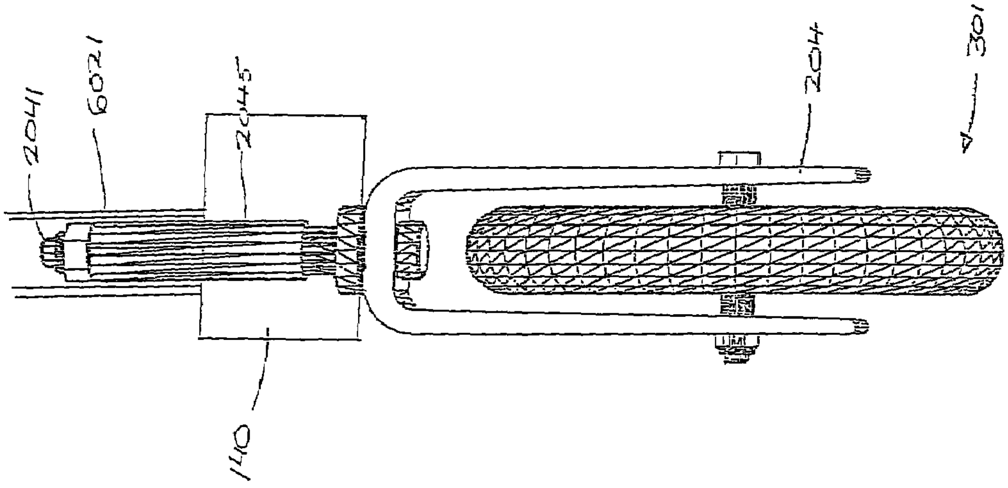
Figure 26A:
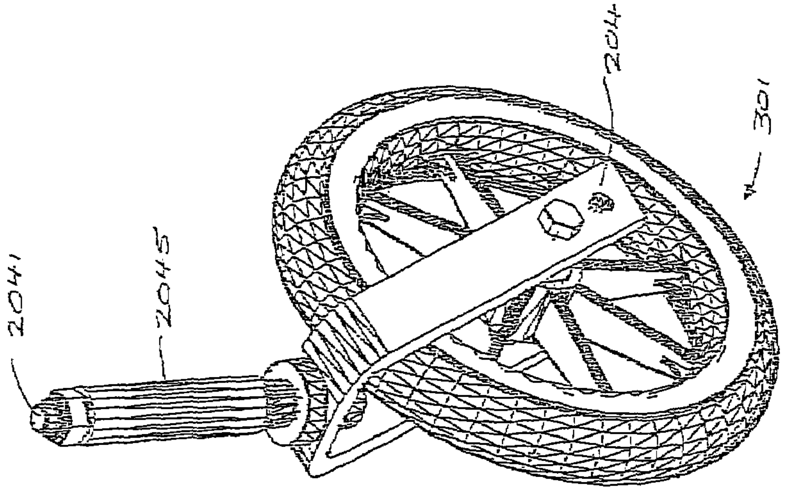

As further shown in FIGS. 25 and 26, the transport type wheels 301, for example wheels with a diameter in a range of approximately four to eight inches or greater, are mounted upon axles held within wheel forks 204. Attached to each wheel fork 204 is a shank 2041 which is inserted through a bore in the lower junction block 140 and axially into the lower distal end of the corresponding upright member. For the wheels 301 at the rear of the frame assembly which may not be required to turn depending upon the design criteria, a split-offset type wedge nut 2042 is provided about the shank 2041 on the wheel fork to permanently lock the shank 2041 (and fork with attached wheel) into engagement with the bore in the junction block 140 and internal to the rear upright members 121, 122, as shown in FIGS. 25A and 25B. For the wheels 301 at the front of the frame (i.e., mounted to the front upright members 601, 602) the shanks 2041 on the wheels forks are further provided with bearings 2045 which fit within the bore in the lower junction blocks and within the distal ends of the upright members 601, 602. The wheels 301, forks 204 and shanks and wedge nuts and/or bearings are also collectively referred to herein as a "wheel assembly". In the preferred embodiments, the shanks 2041 of the wheel assemblies extend through both the junction block and into the respective upright member of the frame assembly. Alternatively, as shown in FIG. 18, the axles of rear wheels 301 on a transport type chair can be mounted directly to or through the lower distal ends of the rear upright members 121, 122 which can extend down through the lower junction blocks 140 as shown. The lower distal ends of the rear upright members 121, 122 can be reinforced for the direct wheel axle mounting as for example by a sleeve or solid insert piece.

As further shown in FIGS. 17-22, the frame assembly 600 has folding front upright members 601 and 602 which are hinged or jointed, as for example by hinge 605 which is incorporated into the length of each of the front upright members 601, 602. As referred to herein, each of the front upright members 601 and 602 have a lower segment and an upper segment which are joined by a hinge 605. Although shown and described in the form of a hinge which rotates in a single plane, the invention also includes the use of multi-directional joint such as ball-and-socket or other joints which operate in multiple dimensions. The front upright member 601 includes lower segment 6011 joined by hinge 605 to upper segment 6012. The front upright member 602 includes lower segment 6021 joined by hinge 605 to upper segment 6022. Lower ends of the front upright members 601, 602 terminate at respective lower junction blocks 140. Front upright members 601 and 602 each extend through and slide relative to a respective upper junction block 150. In the unfolded configuration shown in FIG. 17, the upper junction blocks 150 are located below the hinge 605 in front upright members 601, 602. In the folded configuration shown in FIG. 18, the upper junction blocks 150, which slide relative to front upright members 601 and 602, are located above the respective hinge 605. The references to "above" and "below" are for relative description only with reference to the bottom or wheel base of the chair, and do not limit the invention to any particular arrangement or orientation. The hinges 605 are preferably provided with a bias mechanism which holds the hinge in the straight position shown in FIGS. 21 and 22. This can be, for example, in the form of one or more spring-biased pins which extend from one of the hinge halves to engage the other hinge half only when the hinge is in the straight position. This maintains the upper sections of the front upright members in alignment with the lower sections and facilitates the operation of folding the chair.

Figure 21:
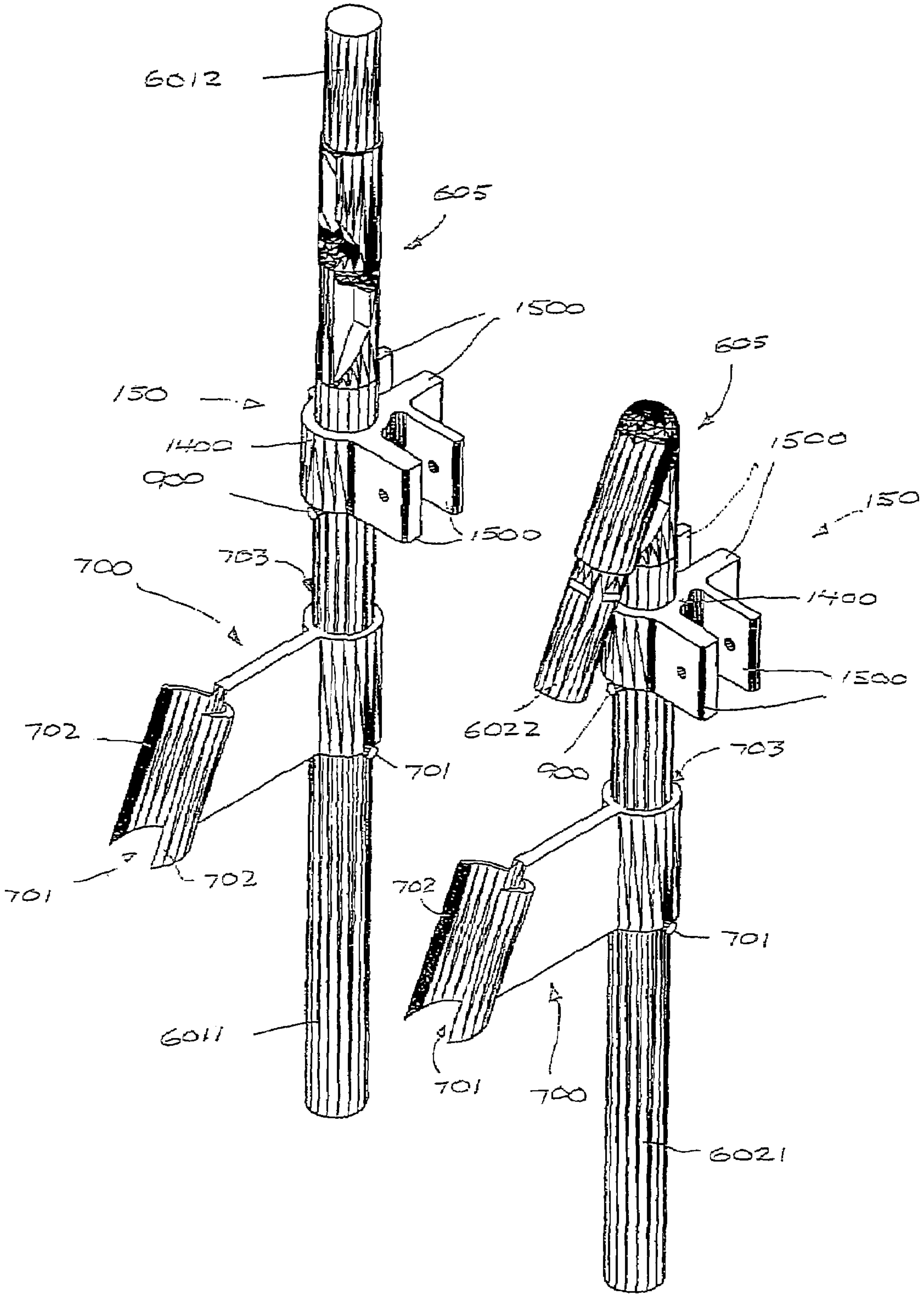
FIG. 21 is a perspective view of a portion of the frame assembly of the folding conveyance, folding transport chair, and folding wheelchair of the present invention.
Figure 22:
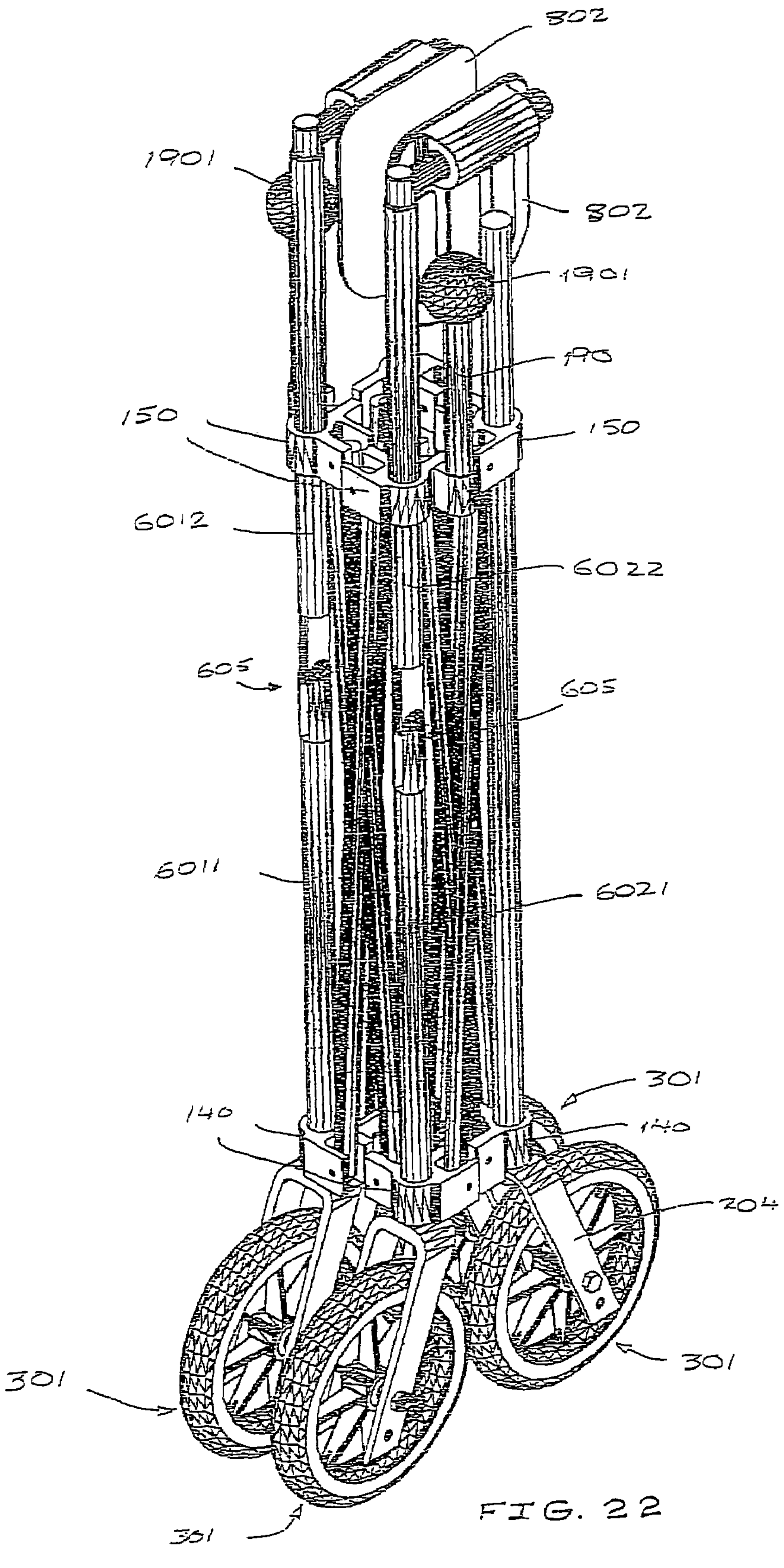
FIG. 22 is a perspective view of an embodiment of a folding transport chair in a folding configuration.

With the chair in the unfolded configuration shown in FIG. 17 and the upper junction blocks 150 located below the hinges 605 in the front upright members 601, 602, the upper segments 6012 and 6022 can be positioned to angle downward toward the wheel base of the chair by operation of the hinges 605. In this position, the upper segments 6012 and 6022 each engage or otherwise contact a strut 700 which extends from the lower segments 6011, 6021. For this engagement the strut 700, as shown in FIG. 21, is preferably formed with a receiving channel 701 defined by radial flanges 702 which extend about the upper segment of the front upright members 601, 602, whether tubular or square channel in form, when in the folded-down position. The struts 700 can be permanently or removably attached to the lower segments 6011, 6021 of the front upright members, or have a radial bore 703 through which the respective lower segments 6011, 6021 fit. With the lower segments 6011, 6021 made of tube stock, the struts 700 can be rotated relative to the frame to a folded position when not engaged with the upper segments 6012, 6022. An index pin 701 can be provided to index the struts 700 in the forward-facing operative position. The struts 700 can then be lifted out of engagement with the pin 701 for rotation in either direction when the chair is folded.

A footrest is provided in one embodiment by a strap 800 which is attached to the distal ends 6012*e* and 6022*e* of the upper segments 6012, 6022. Other types of footrest structures, such as conventional folding foot plates 802 can be attached to the distal ends 6012*e*, 6022*e* of the upper segments 6012, 6022, as shown in FIG. 18. Foot plates 802 can be mounted in one manner upon a right-angle shaft 805, one leg of which is inserted into the distal ends 6012*e*, 6022*e* of the upper segments 6012, 6022. With the upper segments 6012 and 6022 of the front upright members 601, 602 engaged with or in contact with struts 700, the entire frame assembly 600 is strengthened and stiffened. Pressure applied to the footrest, upon strap 800 or foot plates 802, further tightens and stiffens the frame assembly 600.

As shown in FIGS. 17-20 and 23, the frame assembly 600 further includes arm support struts 190 which extend upward from the front upper junction blocks 150 to provide an attachment and support structure for the forward ends of the arm chairs, in fabric form 183, or the alternate solid form 185 as further described herein. The arm support struts are preferably mounted directly to the front upper junction blocks 150 which can be formed with a receiver for this purpose. Alternatively, a separate strut mounting fitting can be attached to the front upper junction blocks. Hand grips 1901 can be attached to the upper distal ends of the arm support struts 190, as can grips 2001 be attached to the upper distal ends of the rear upright members 121, 122 for handling of the chair.

Figure 23:
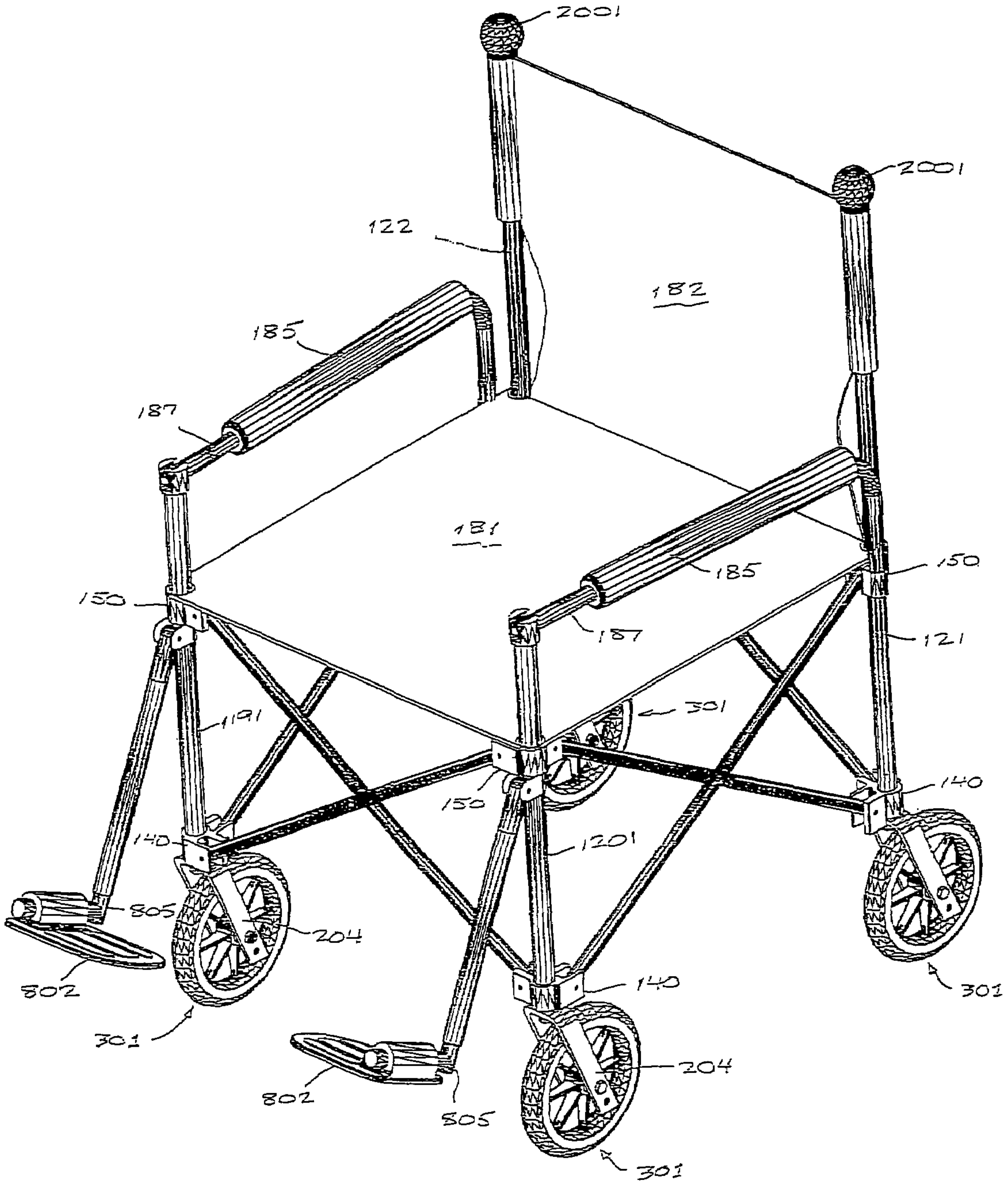
FIG. 23 is a perspective view of an alternate embodiment of a folding transport chair of the present invention.
Figure 24A:
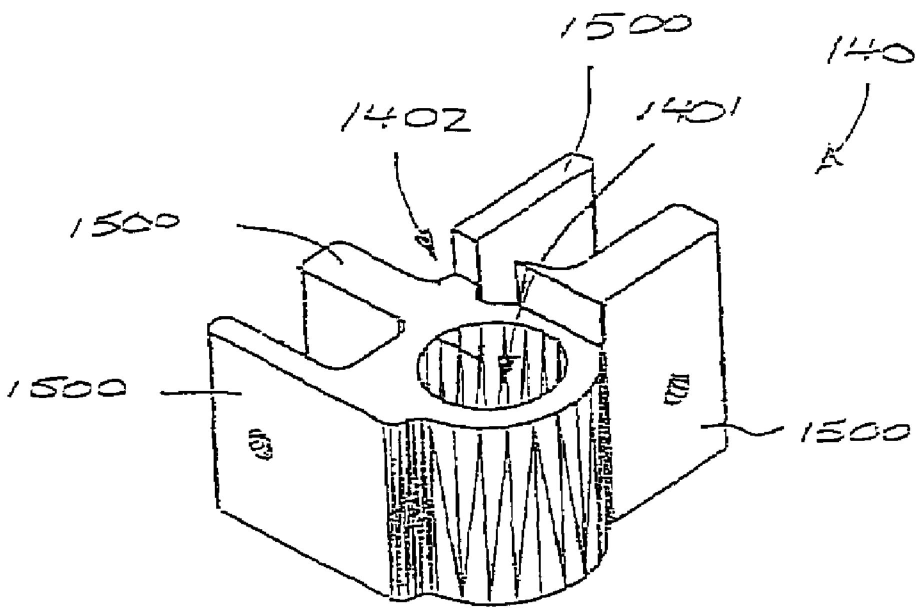
FIGS. 24A and 24B are perspective views junction blocks of the invention.
Figure 24B:
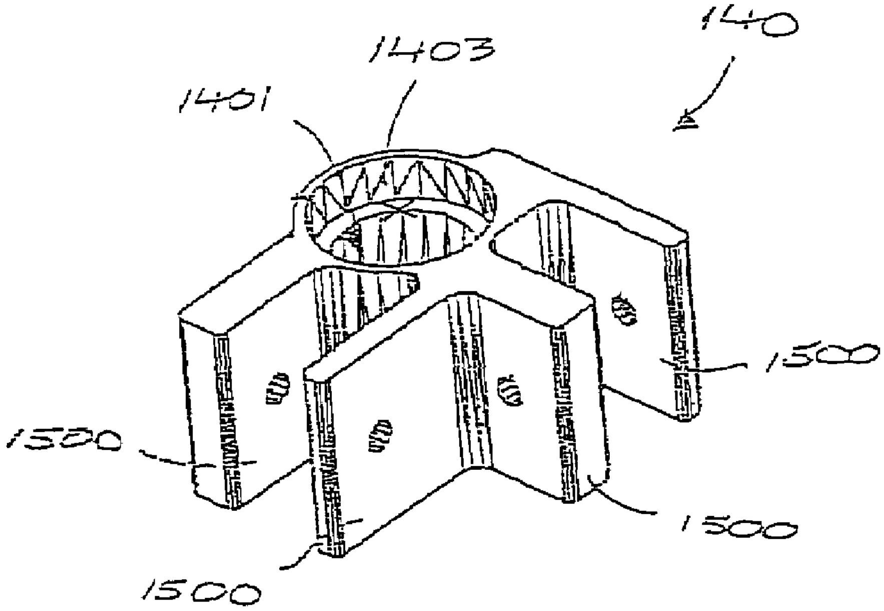

The invention further includes alternate embodiments of the upper and lower junction blocks 140, 150, which in the form shown in FIGS. 17-24 have a body 1400 with a bore 1401 for axially receiving one of the upright frame members, and, as shown in FIGS. 24A and 24B, pairs of flanges 1500 which extend from the body 1400 to form a first and second clevis, each of which receive an upper or lower end or distal end of one of the side frame members. Pins 1501 are installed through the flanges 1500 and the upper and lower ends of the side frame members which are thus pivotally attached to the respective upper and lower junction blocks. As shown, the upper and lower junction blocks 140, 150 of this particular embodiment can be identically configured, which of course contributes to economy of manufacture of the frame assembly

600. The upper junction blocks 150 located at the front of the frame assembly can be modified to include a mounting structure for the arm support struts 190. In another embodiment, one or more of the flanges 1500 can be eliminated so that only a single flange extends in a given direction from the junction block body 1400, and to which a frame member is attached by a pin. Although the upper and lower junction blocks 140, 150 of this embodiment are shown with a double-flange clevis between which the ends of the side frame members fit, it is possible to eliminate one of the flanges 1500 of each pair and still have adequate structural pin connection of the frame members.

Although the upper and lower junction blocks 140, 150 are identically configured, they are positioned in the frame assembly 110 in differing orientations, so that the junction blocks which are opposed, e.g., the lower junction blocks 140 which are aligned with the side members 111-118, do not have the opposing pairs of flanges 1500 aligned, but are aligned with the pair of flanges of the corresponding upper junction block 150 to which the corresponding side member is attached. For example, as shown on the right side of FIG. 17, the pairs of flanges 1500 of the lower junction block 140 in which the side member 113 fits are aligned with the pairs of flanges of the corresponding upper junction block 150, and are not aligned with the pairs of flanges of the lower junction block 140 and upper junction block 150 in which the ends of side member 114 fit, because side member 114 is inboard of side member 113. To achieve such alignment of the pairs of flanges for the upper and lower ends of each side member, the upper junction blocks 150, although identical to lower junction blocks 140, are inverted relative to the lower junction blocks 140 whereby the pairs of flanges 1500 of the upper and lower junction blocks on each upright member are not aligned. Also, the pairs of flanges of the opposing upper junction blocks 150 are not aligned, and the pairs of flanges of the opposing lower junction blocks 140 are not aligned.

As shown in FIG. 24A, the lower junction blocks 140 for attachment to the rear of the frame assembly at the lower distal ends of the rear upright members 121, 122 can have a step 1402 machined into a lower surface which fits with the wheel fork 204 to prevent the fork 204 (of a wheel assembly which includes a wheel 301 mounted upon an axle in a wheel fork 204) from turning relative to the frame. This embodiment is applicable for a transport or wheel chair in which the rear wheels are to be directionally fixed. Alternatively, all four of the lower junction blocks can be identically configured. As shown in FIG. 24B, lower junction blocks 140 for the front of the frame assembly 600, at the lower distal ends of the front upright frame member 601, 602, can be provided with a bore 1403 for receiving at least a portion of a wheel shank or bearing about the wheel shank which extends from the corresponding wheel fork 204.

Another novel design feature which further strengthens the frame assembly 600 is the use of junction block stops 900, best shown in FIG. 21, located below each of the four upper junction blocks 150 to limit travel of the upper junction blocks 150 any lower on the respective upright member. This prevents the entire frame assembly 600 from overextending in the unfolded position, and substantially stiffens the frame when the upper junction blocks 150 are in contact with and bear against the junction block stops 900. The junction block stops 900 can be in the form of travel limiting pins as shown which project from the frame members proximate to the upper junction blocks 150, and located just below or in contact with the underside of the junction blocks when the frame assembly 110 is in the unfolded configuration. As shown in FIG. 21, the junction block stops 900, for example in the form of pins which limit any additional travel of the upper junction blocks 150 toward the base of the frame assembly 110. With the frame assembly 110 under a conventional load such as that of a passenger in the seated position, components of the load are transferred by the seat to the upper junction blocks 150 which in turn contact pins 900. This positively locks the frame assembly 110 into the unfolded configuration, stiffens the frame structure, and limits the amount of stress applied to the horizontal component 180 of the seat structure. Alternative embodiments of the junction block stops 900 include an outer sleeve which is positioned under the upper junction blocks 150 by a set screw, or a one or two-piece collar which fits around each upright member and is secured by friction, weld, fastener or other bond or hardware. Any of the various forms of the junction block stops 900 can also be made of any plastic material of adequate strength.

Figure 19:
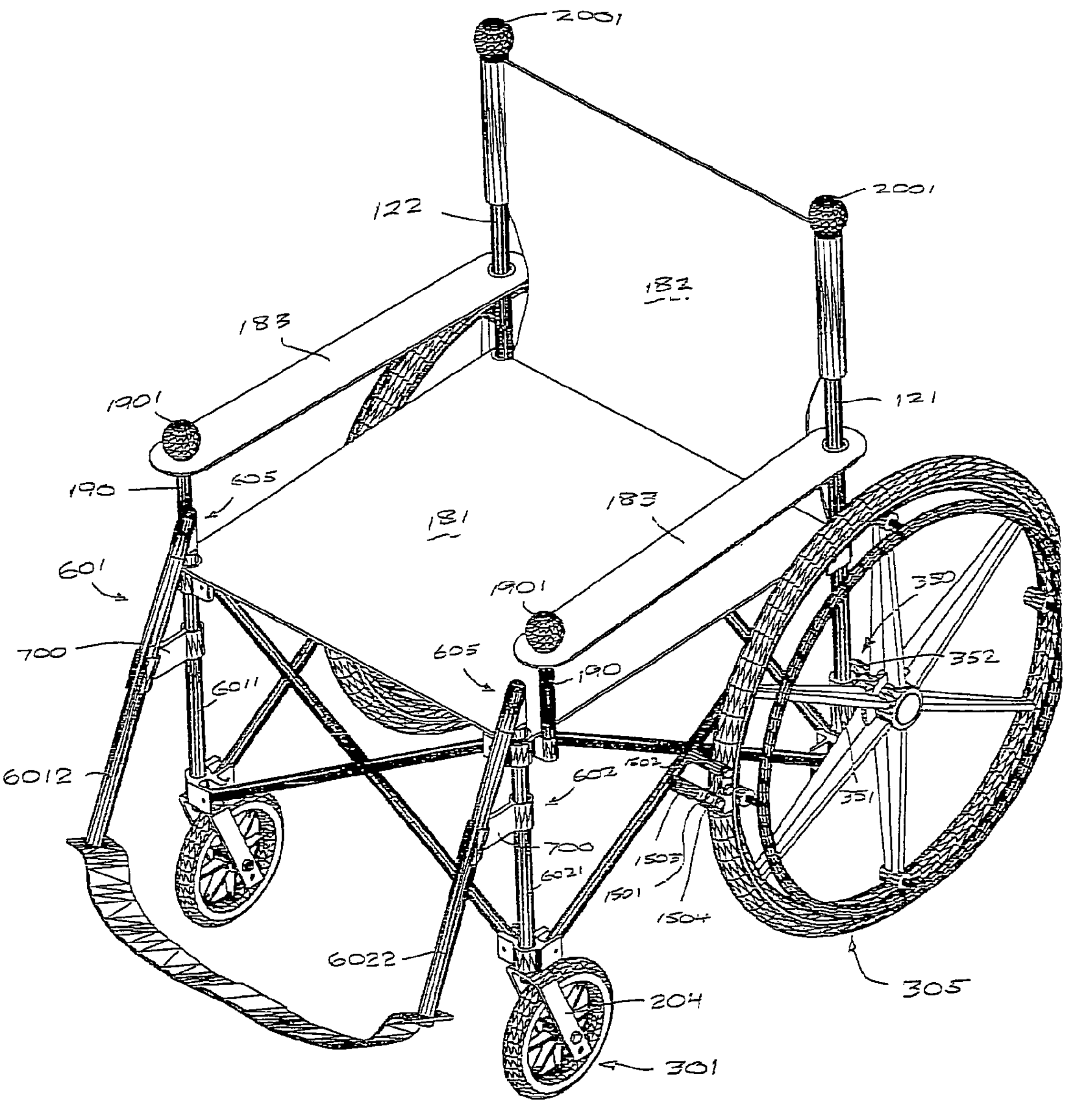
FIG. 19 is a perspective view of a folding wheelchair of the present invention.
Figure 20:
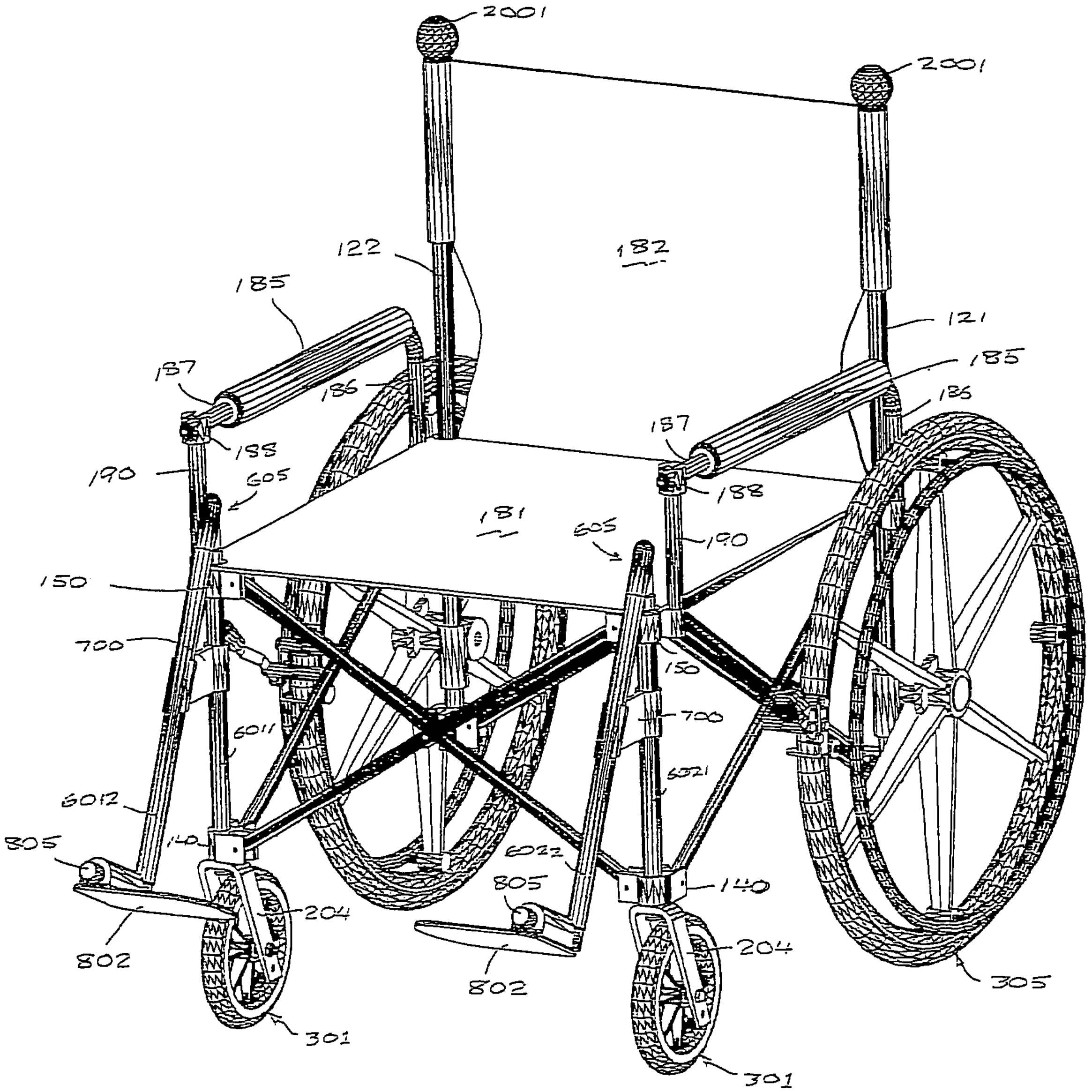
FIG. 20 is a perspective view of an alternate embodiment of a folding wheelchair of the present invention.

As further shown in FIGS. 19 and 20, the frame assembly 600 is readily adaptable for configuration as a conventional wheel chair, with large (e.g. 24 inch) wheels in the rear, and smaller (e.g. 7 or 8 inch) wheels in the front. To mount the larger rear wheels 305 to the frame assembly 600, the invention includes a novel wheel mounting block 350 which has a mounting sleeve 351 which fits over or about the respective rear upright members 121, 122 whether in tubular or square tube or other cross-sectional form. The mounting sleeve 351 can be made from two halves, or butterfly halves, which are bolted together about the upright members, and may have tangs or protuberances which engage the outer surface of the upright member to prevent rotation. Attached to the mounting sleeve is a wheel axle journal 352 which is generally horizontally oriented to receive a wheel axle of wheel 305. The mounting sleeve 351 and axle journal 352 may or may not be formed integrally with or in contact with the corresponding or adjacent junction block 140. The wheel axle journals 352 may extend from one side of the corresponding upright member 121, 122 to an opposite side, so that the moment of the axle is distributed across the width of the upright member to reduce distortion of the frame assembly 110. Alternatively, the wheel axle may be located within the wheel axle journal lateral to or not intersecting with the respective upright member. This same type of mounting sleeve and axle journal can be employed in the construction of a transport chair of the invention, as shown in FIGS. 15 and 16, for example in the form of ferrules 149 and axle journals 145.

As shown in FIGS. 19 and 20, a wheel brake assembly 1501-1504, including shafts 1501, 1502, bracket 1504 and handle 1503, as known in the wheel chair art, can be mounted directly to the frame assembly 600, including mounting of at least one of the shafts 1501-1502 at an intersection of two of the side frame members, 113-114 or 117-118 as shown. This further strengthens the frame assembly and provides equal distribution of forces upon the frame when the brake is engaged with wheel 305.

FIG. 20 illustrates an alternate embodiment of a folding wheelchair of the invention which has a solid type arm 185, which may be fabricated from a section of tubing to have a vertical segment 186 which extends upward from the rear upright junction blocks 150 or proximate thereto, and a horizontal segment 187 which extends forward toward the front of the chair. The lower end of the vertical segment 186 can be simply mounted upon a horizontal pin which allows the entire arm to pivot when the chair is folded. A forward distal end of segment 187 is received in a yoke 188 mounted at the top of the arm support strut 190. When the chair is to be converted into the folded condition, each arm 185 is lifted out of engagement with the corresponding yoke 188 and pivots about the mounting pin so that the horizontal segment 187 or the arm is generally aligned with the other members of the frame assembly.

FIG. 23 illustrates an alternate embodiment of a collapsible conveyance, folding transport chair and folding wheelchair of the invention which has a different type of frame assembly, indicated generally at 1200, which utilizes telescoping front upright members 1201 and 1191 to enable conversion to a folded configuration. Internal to each of the front upright members 1201 and 1191 is a smaller diameter inner rod or tube which is fixed to the front lower junction blocks. When the frame assembly 1200 is folded, the outer tubes 1201 and 1191 rise above the front lower junction blocks 140 by telescoping over the inner tube. This allows the four upright members of the frame to be drawn together as the crossing pairs of the frame side members, 111-112, 113-114, 115-116 and 117-118, scissors together in substantial vertical alignment. The upper distal ends of the front upright members 1201 and 1191 are each fitted with a yoke 188 for receiving the forward end of arms 185 as described. The footrests are also mounted to the front upright members, or to the front upper junction blocks 150.

Figure 27:
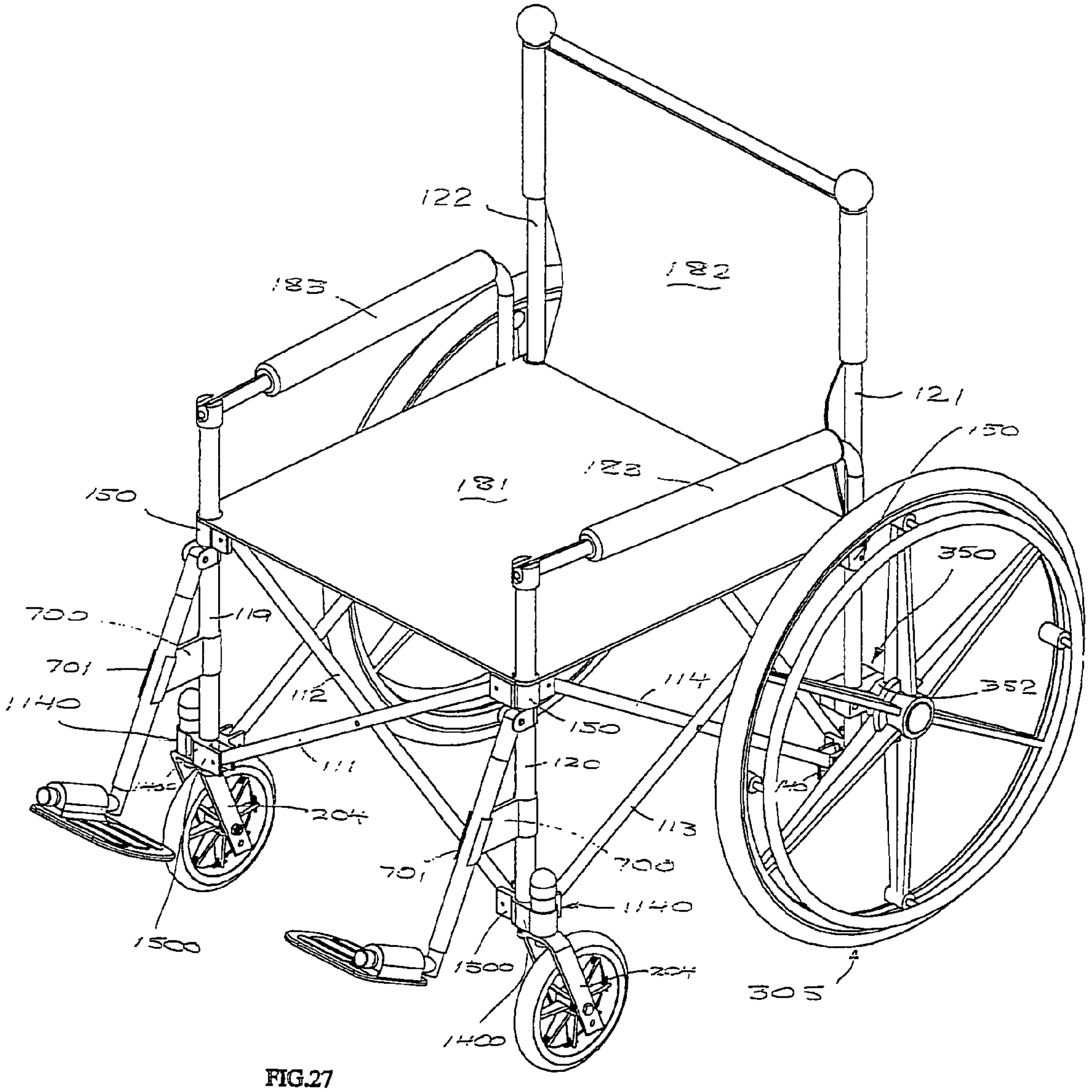
FIG. 27 is a perspective view of an alternate embodiment of a folding wheelchair which embodies various aspects of the invention.
Figure 28:
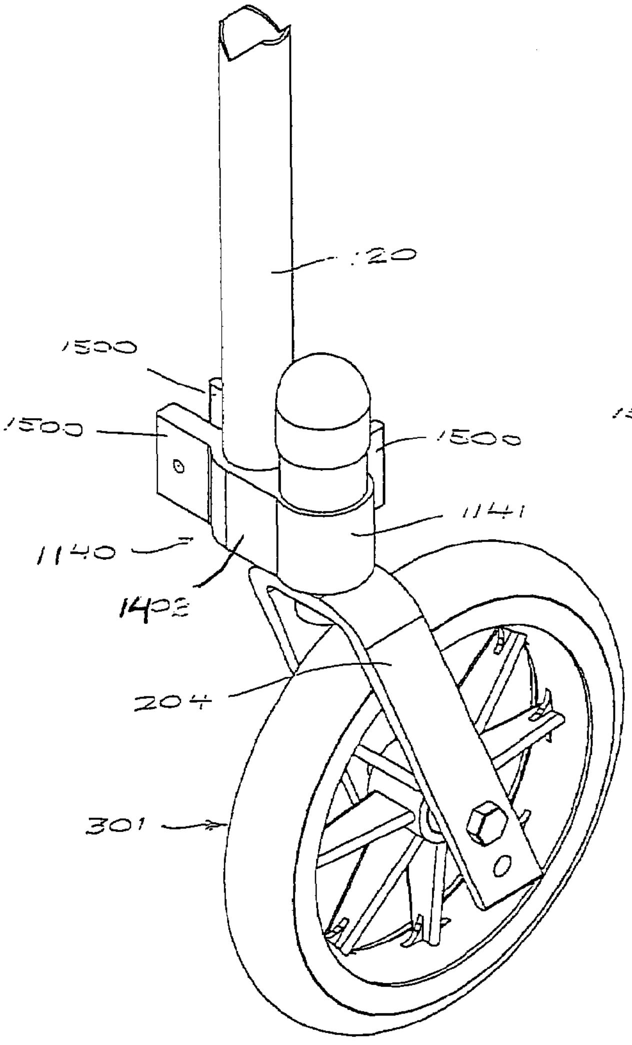
FIG. 28 is a perspective view of an embodiment of a caster wheel mount junction block of the invention.
Figure 29:
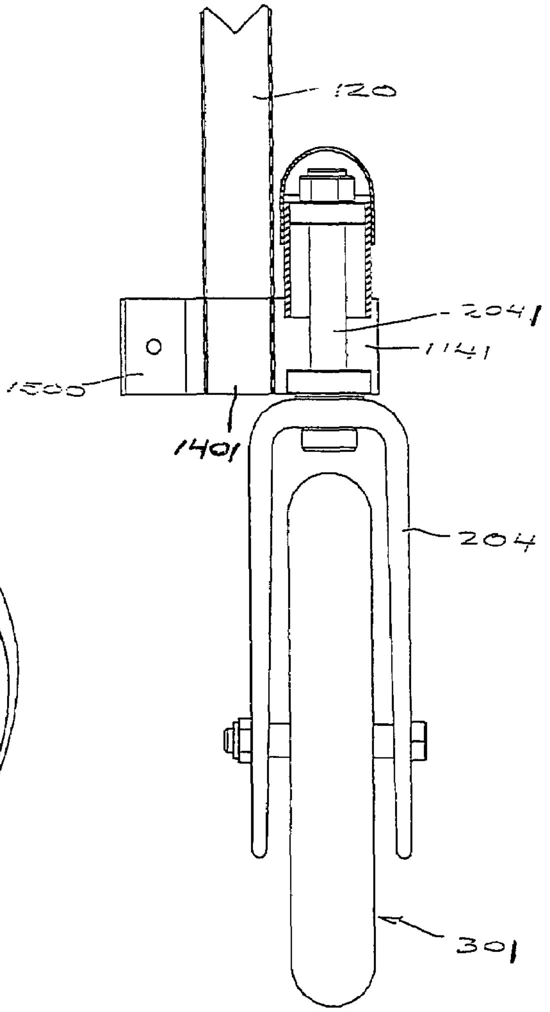
FIG. 29 is a partial cross-sectional view of the caster wheel mount junction block shown in FIG. 28.
Figure 30A:
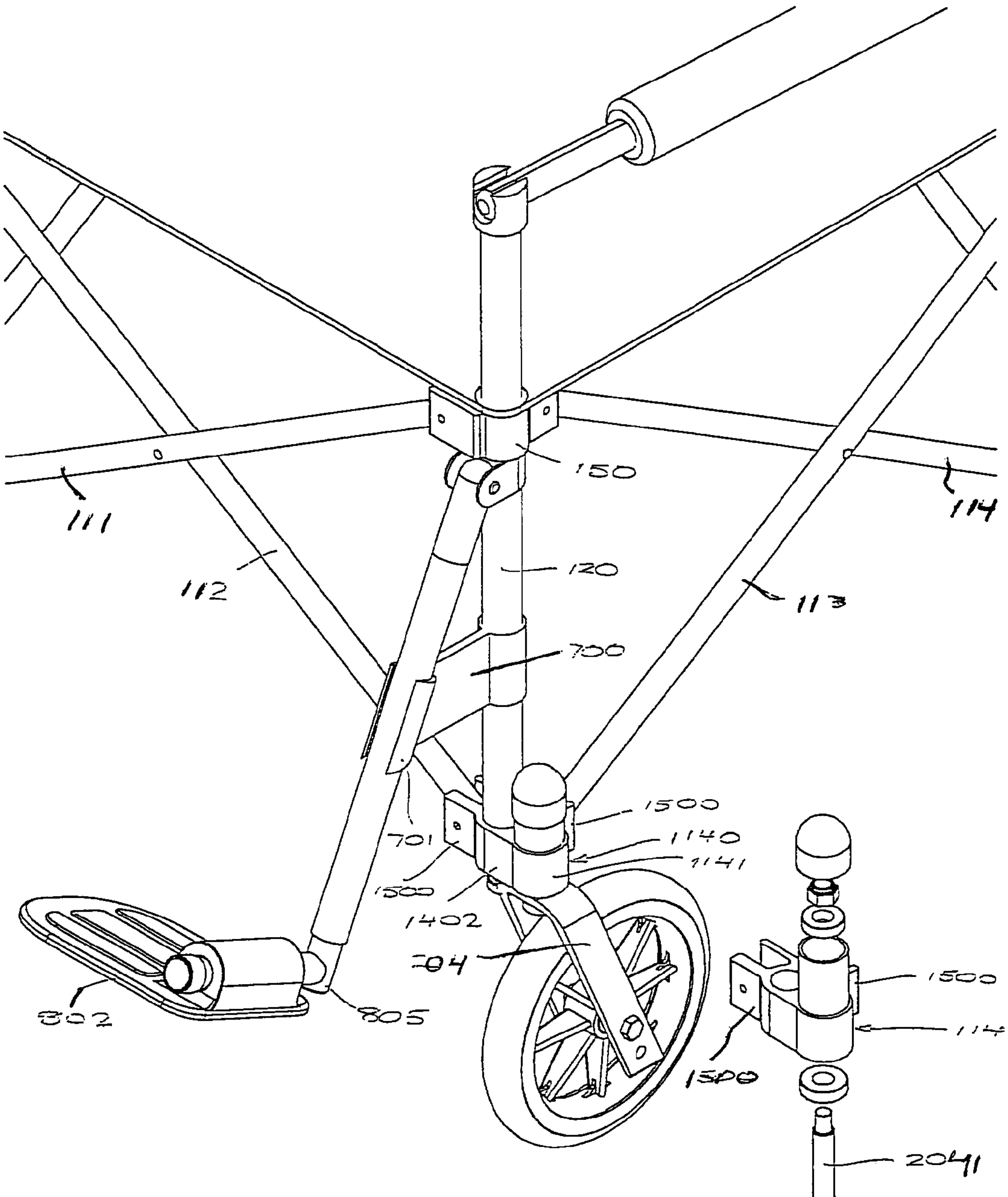
FIG. 30A is a perspective view of a portion of a transport chair type collapsible conveyance of the invention embodying the caster wheel mount junction block of the invention.
Figure 30B:
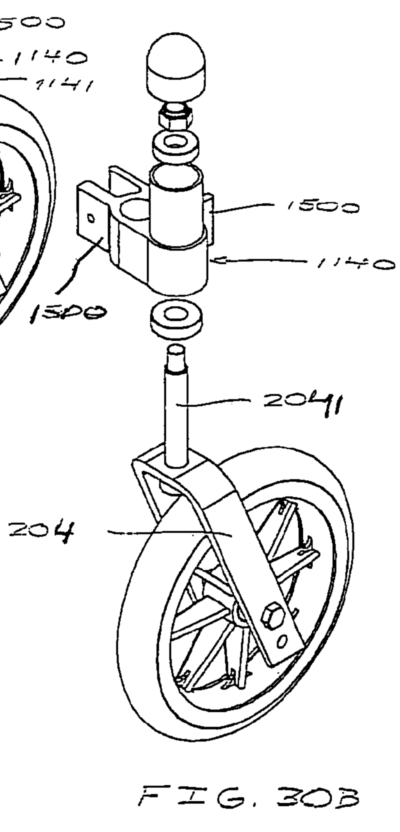
FIG. 30B is a perspective assembly view of a caster wheel and the caster wheel mount junction block of the invention.

FIGS. 27, 28, 29, 30A and 30B illustrate an alternate embodiment of a collapsible conveyance of the invention, in a wheelchair form, having relatively larger rear wheels 305, such as for example 24 inch diameter size wheels or any other suitable size, which are mounted by rear wheel mounting blocks 350 as previously described, one on each of the rear upright members 121 and 122 at a location between the respective upper junction block 150 and lower junction block 140. Also shown in FIG. 27 are offset caster mount junction blocks 1140, which can be used in either of the described transport chair or wheelchair collapsible conveyances. The offset caster mount junction blocks 1140 has a similar body 1400 from which extend the described pairs of flanges 1500 for receiving the respective ends of the frame side members, and a caster shank receiving ferrule 1141 which is laterally offset from the axis of the respective front upright member 119 or 120. The caster shank 2041 is received and held within the caster shank receiving ferrule 1141 by suitable engagement and bearing components and hardware as previously described with respect to the lower front junction blocks 140. The caster shank receiving ferrule 1141 of the offset caster mount junction blocks 1140 may be located in any position which is laterally or radially offset from the respective front upright member 119, 120.

Figure 31:
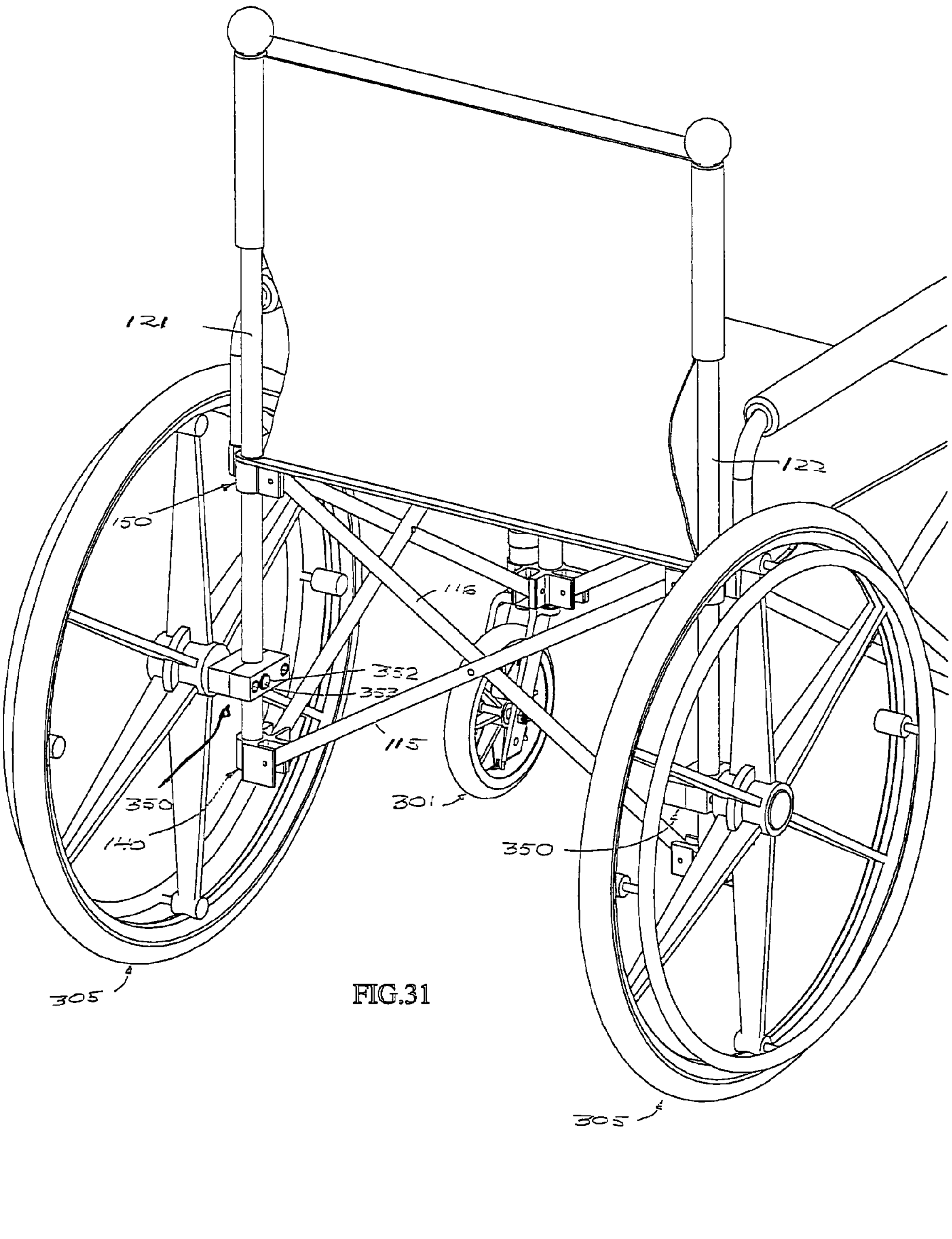
FIG. 31 is a rear perspective view of a wheelchair type collapsible conveyance of the invention.

FIG. 31 illustrates a wheelchair version of the collapsible conveyance of the invention, wherein rear wheels 305, which are relatively larger than front wheels 301, are mounted to the respective rear upright members 121 and 122 by rear wheel mounting blocks 350 which fit or clamp around or are otherwise attached to the respective upright member at a location on the rear upright member which is between the respective upper junction block 150 and the lower junction block 140. As illustrated, the rear wheel mounting blocks 150 may be formed in halves which fit about a cross-section of the rear upright member, and through which a bore is formed to receive an axle 353 of the rear wheel 305, for example within an wheel axle journal 352 located within the bore. Other mechanisms and hardware for mounting the rear wheels 305 to the respective rear upright members 121, 122 are contemplated which accomplish the equivalent structure of securing the axles of the rear wheels 305 perpendicular to the rear upright members, and at a location between the respective upper junction block 150 and lower junction block 140. Such additional or alternate mechanism and hardware includes release fittings for releasing engagement of the axles 353 of the rear wheels 305, such as manually operable release fittings, for easy removal of the rear wheels 305 from the frame.

Figure 32:
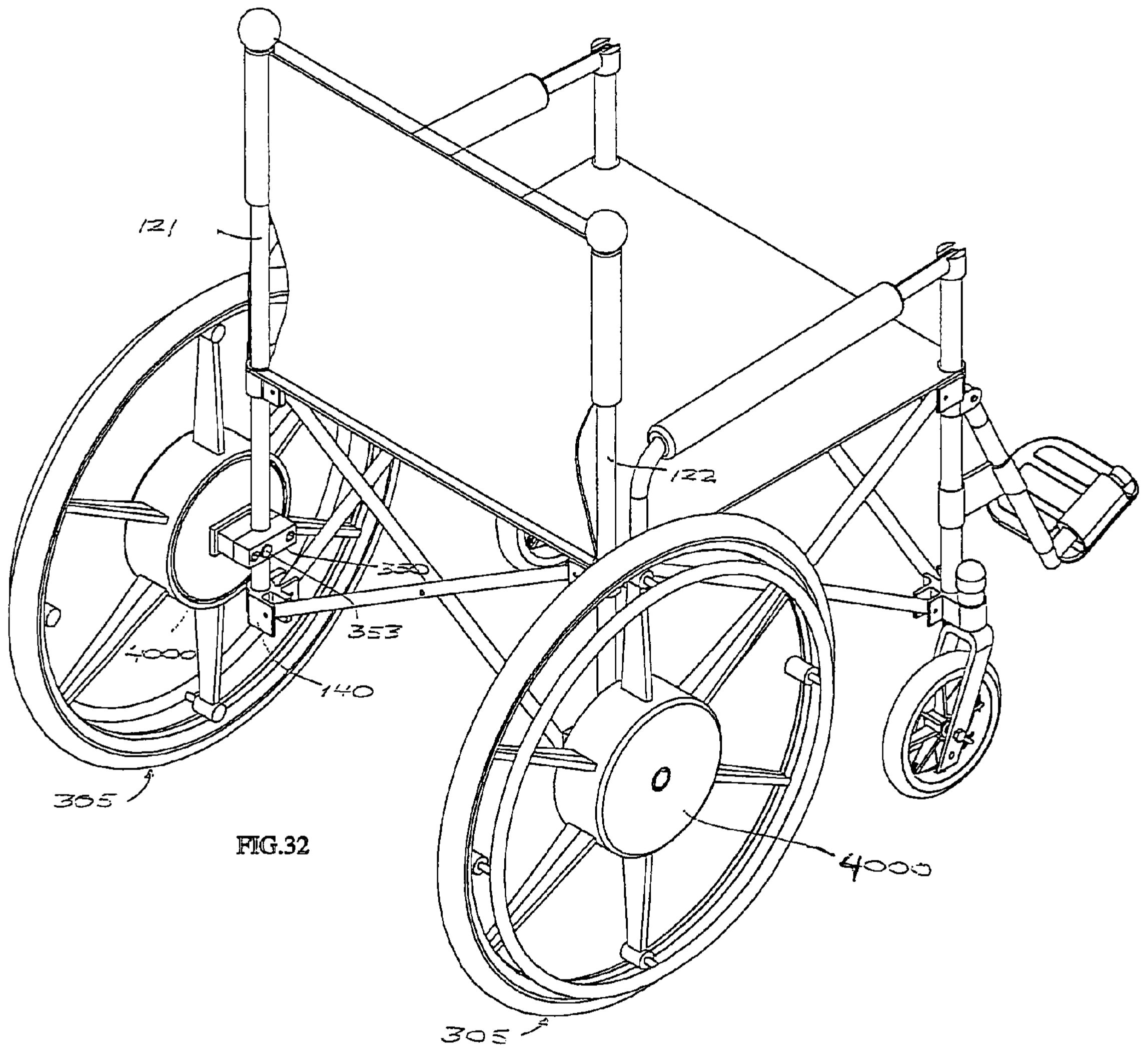
FIG. 32 is a perspective view of a powered embodiment of a wheelchair type collapsible conveyance of the invention.

FIG. 32 illustrates another embodiment of a wheelchair type collapsible conveyance wherein the rear wheels 305 are further equipped with a motorized hub 4000 mounted to the rear wheel mounting bracket 350 mounted to the rear upright frame members 121, 122 as described. The motorized hub 4000 is preferably a self-contained drive mechanism and drive which induces powered rotation of the wheel 305 to which is connected by for example a drive mechanism, such as meshed gear drive, within hub 4000. A power source may also be contained within each hub 4000. The releasable connection of the wheel mounting bracket 350 allows the motorized hub 4000 and associated wheel 305 to be removed from the frame as a single unit. In addition to facilitating compact folding of the chair, the detachment allows for easy access to the motorized hub for maintenance or power re-charging.

Although the invention has been described in detail with reference to certain preferred and alternate embodiments, it apparent to those of ordinary skill in the art that the fundamental concepts of the invention are executable in other equivalent forms, including other combinations of various aspects of the invention, which are within the scope of the invention as described and claimed.

What is claimed is:

1. A collapsible conveyance comprising:

a frame assembly having multiple interconnected frame members including first and second front and rear upright members at corners of the frame assembly, and side members in interconnected pairs spanning between each of the upright members;

upper and lower junction blocks at intersections of the side members with the first and second front and rear upright members;

each of the front upright members extending through a respective upper junction block, each of the rear upright members extending through a respective rear upper junction block;

lower ends of the side members attached to lower junction blocks at lower ends of the front and rear upright members, each of the lower junction blocks having two pairs of flanges between which the lower ends of the side members fit respectively;

upper ends of the side members attached to respective upper junction blocks, each of the upper junction blocks having two pairs of flanges between which the upper ends of the side members fit respectively;

the first and second front upright members and first and second rear upright members extending between the respective lower junction blocks and the respective upper junction blocks;

first and second front wheels mounted to casters with a caster shank which is received by offset caster mount junction blocks, the offset caster mount junction blocks having a body from which extend pairs of flanges for receiving respective ends of the frame side members, and a caster shank receiving ferrule which is laterally offset from an axis of a respective front upright member, the respective front upright member received in an opening in the body, a caster shank of the caster received and held within the caster shank receiving ferrule, the caster shank receiving ferrule of the offset caster mount junction blocks located in a position which is laterally or radially offset from the respective front upright member;

first and second rear wheels mounted to the respective first and second rear upright members at a location between the respective upper and lower junction blocks, and a support structure attached to the frame assembly.

2. The collapsible conveyance of claim 1 wherein the first and second front wheels and first and second rear wheels are identical and have a diameter in an approximate range of 6 inches to 12 inches.

3. The collapsible conveyance of claim 1 wherein the first and second front wheels are smaller than the first and second rear wheels.

4. The collapsible conveyance of claim 1 wherein the rear wheels are directionally fixed.

5. The collapsible conveyance of claim 1 further comprising a brake attached to the one of the rear upright members and operative to contact one of the rear wheels.

6. The collapsible conveyance of claim 1 further comprising at least one motor located in one of the rear wheels and operative to power rotation of at least one of the rear wheels.

* * * * *